(12) United States Patent
Chung et al.

(10) Patent No.: US 11,864,013 B2
(45) Date of Patent: Jan. 2, 2024

(54) METHOD AND APPARATUS FOR TRANSMITTING OR RECEIVING CHANNEL STATE INFORMATION IN WIRELESS COMMUNICATION SYSTEM

(71) Applicant: LG ELECTRONICS INC., Seoul (KR)

(72) Inventors: Jaehoon Chung, Seoul (KR); Kyuseok Kim, Seoul (KR); Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 17/069,090

(22) Filed: Oct. 13, 2020

(65) Prior Publication Data

US 2021/0266769 A1    Aug. 26, 2021

(30) Foreign Application Priority Data

Aug. 13, 2019  (KR) .......................... 10-2019-0099172

(51) Int. Cl.
*H04W 24/10* (2009.01)
*H04W 72/04* (2023.01)
*H04W 76/28* (2018.01)
*H04W 72/0446* (2023.01)

(52) U.S. Cl.
CPC ....... *H04W 24/10* (2013.01); *H04W 72/0446* (2013.01); *H04W 76/28* (2018.02)

(58) Field of Classification Search
CPC . H04W 24/10; H04W 72/0446; H04W 76/28; H04W 72/085; H04L 5/001; H04L 5/0051; H04L 5/0057; H04L 5/0094
See application file for complete search history.

(56) References Cited

U.S. PATENT DOCUMENTS

| 2017/0366377 | A1* | 12/2017 | Papasakellariou .......................... H04L 27/2613 |
| 2019/0058513 | A1* | 2/2019 | Mizusawa ................ H04B 7/04 |
| 2019/0215897 | A1* | 7/2019 | Babaei .................. H04W 76/38 |
| 2021/0067221 | A1* | 3/2021 | Yang ................. H04W 72/0446 |
| 2022/0224398 | A1* | 7/2022 | Fryking ............... H04B 7/0695 |

* cited by examiner

*Primary Examiner* — Walli Z Butt
*Assistant Examiner* — Thad N Defauw
(74) *Attorney, Agent, or Firm* — Fish & Richardson P.C.

(57) ABSTRACT

Provided are a method for transmitting and receiving channel state information (CSI) and an apparatus for the same. Specifically, the method includes receiving configuration information related to a CSI report, wherein the configuration information includes first information related with a time domain behavior of the CSI report, and based on the first information, one of (i) periodic, (ii) semi-persistent or (iii) aperiodic may be configured as a behavior of the CSI report in the time domain, receiving second information related with a time domain behavior of the CSI report, wherein the second information may be configured for a time duration including a plurality of specific units based on a specific unit in the time domain, receiving a reference signal for a CSI measurement, performing the CSI measurement based on the reference signal, and reporting the CSI in the time domain based on the first information and the second information.

10 Claims, 19 Drawing Sheets

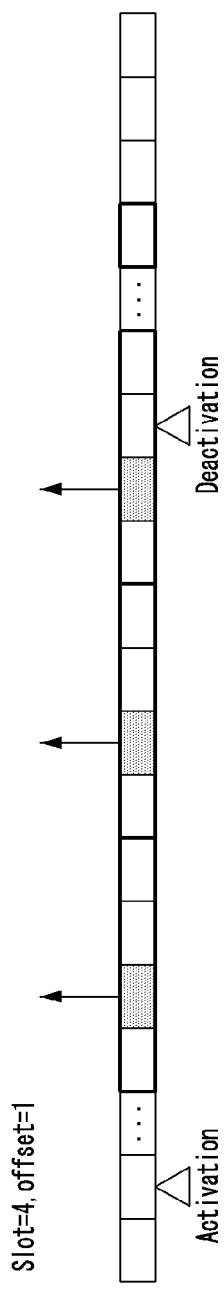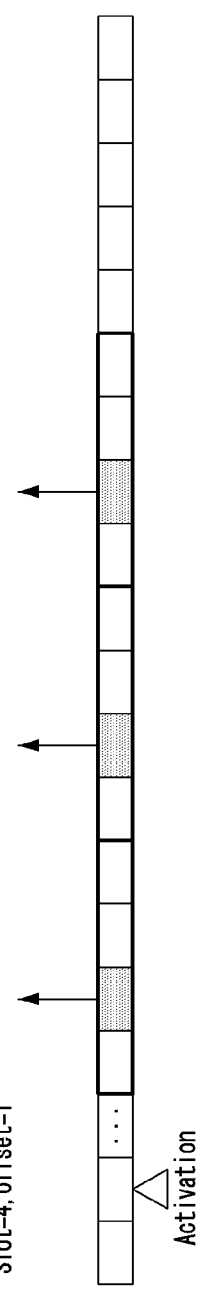
FIG. 17A
FIG. 17B

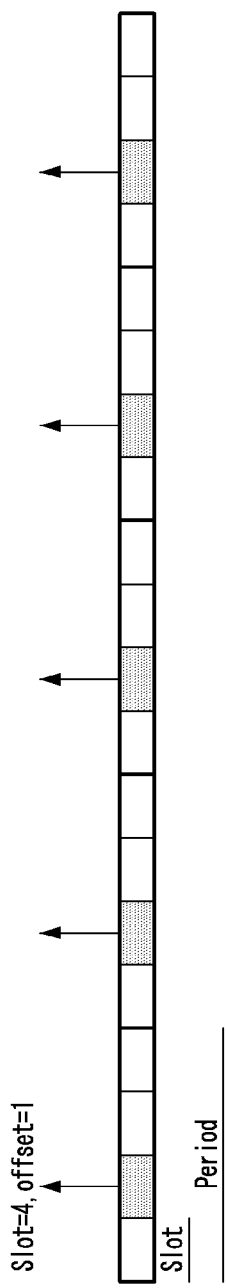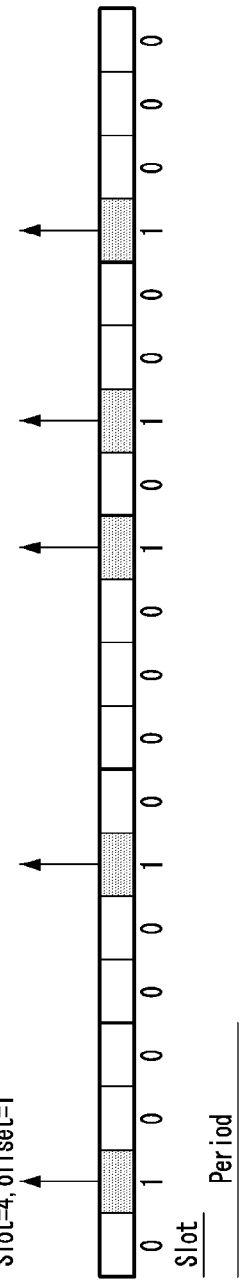
FIG. 18A
FIG. 18B

METHOD AND APPARATUS FOR TRANSMITTING OR RECEIVING CHANNEL STATE INFORMATION IN WIRELESS COMMUNICATION SYSTEM

CROSS-REFERENCE TO RELATED APPLICATIONS

This application claims the benefit of Korea Patent Application No. 10-2019-0099172, filed on Aug. 13, 2019, which is incorporated herein by reference for all purposes as if fully set forth herein.

BACKGROUND OF THE DISCLOSURE

Field of the Disclosure

The present disclosure relates to a wireless communication system and, more particularly, to a method of transmitting and receiving channel state information and an apparatus supporting the same.

Related Art

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY OF THE DISCLOSURE

The present disclosure proposes a method of transmitting and receiving channel state information (CSI) in a wireless communication system.

Specifically, the present disclosure proposes a method of configuring report setting, resource setting, etc. for a CSI report.

Furthermore, the present disclosure proposes a method of configuring indication information (or indicator) for each specific unit (e.g., for each specific resource unit or specific time unit in a time domain and indicating and configuring a time domain behavior of a UE based on the indication information.

Furthermore, the present disclosure proposes a method of configuring a time domain behavior of a CSI report by considering a DRX cycle.

Technical objects to be achieved in the present disclosure are not limited to the aforementioned technical objects, and other technical objects not described above may be evidently understood by a person having ordinary skill in the art to which the present disclosure pertains from the following description.

In an aspect, a method for reporting, by a user equipment (UE), channel state information (CSI) in a wireless communication system may include receiving configuration information related to a CSI report, wherein the configuration information includes first information related with a time domain behavior of the CSI report, and based on the first information, one of (i) periodic, (ii) semi-persistent or (iii) aperiodic may be configured as a behavior of the CSI report in the time domain, receiving second information related with a time domain behavior of the CSI report, wherein the second information may be configured for a time duration including a plurality of specific units based on a specific unit in the time domain, receiving a reference signal for a CSI measurement, performing the CSI measurement based on the reference signal, and reporting the CSI in the time domain based on the first information and the second information.

Furthermore, in the method according to an embodiment of the present disclosure, the second information may have a bitmap form, and each bit of the bitmap may correspond to each specific unit of the plurality of specific units.

Furthermore, in the method according to an embodiment of the present disclosure, the CSI report may be transmitted in a specific unit corresponding to bits corresponding to 1 in the bitmap, and the CSI report may not be transmitted in a specific unit corresponding to bits corresponding to 0 in the bitmap.

Furthermore, in the method according to an embodiment of the present disclosure, the specific unit may have one of a slot, a subframe, a half-frame or a frame as a unit.

Furthermore, the method according to an embodiment of the present disclosure may further include receiving information for the specific unit.

Furthermore, in the method according to an embodiment of the present disclosure, the time duration may be determined based on the number of bits of the bitmap.

Furthermore, in the method according to an embodiment of the present disclosure, a "periodic" CSI report behavior may be configured based on the first information, and the specific unit may have a period as a unit.

Furthermore, in the method according to an embodiment of the present disclosure, may further include receiving information that activates the CSI report based on a "semi-persistent" CSI report behavior being configured based on the first information.

Furthermore, in the method according to an embodiment of the present disclosure, the CSI report may be terminated based on the second information regardless of a signal that deactivates the CSI report.

Furthermore, in the method according to an embodiment of the present disclosure, the second information may be configured for time duration including a plurality of slots based on a slot unit in the time domain, and an offset value per each period for a periodic CSI report behavior may be determined based on the second information.

Furthermore, in the method according to an embodiment of the present disclosure, the specific unit may correspond to a DRX cycle.

Furthermore, in the method according to an embodiment of the present disclosure, the CSI report may be transmitted in an "on duration" of the DRX cycle corresponding to bits corresponding to 1 in the bitmap.

Furthermore, in the method according to an embodiment of the present disclosure, an "aperiodic" CSI report behavior may be configured based on the first information, and an aperiodic CSI report may be indicated based on the second information.

In an embodiment, a user equipment (UE) reporting channel state information (CSI) in a wireless communication system includes one or more transceivers, one or more processors, and one or more memories storing instructions for operations executed by the one or more processors and connected to the one or more processors. The operations may include receiving configuration information related to a CSI report, wherein the configuration information includes first information related with a time domain behavior of the CSI report, and based on the first information, one of (i) periodic, (ii) semi-persistent or (iii) aperiodic is configured as a behavior of the CSI report in the time domain, receiving second information related with a time domain behavior of the CSI report, the second information may be configured for a time duration including a plurality of specific units based on a specific unit in the time domain, receiving a reference signal for a CSI measurement, performing the CSI measurement based on the reference signal, and reporting the CSI in the time domain based on the first information and the second information.

In an embodiment, a method receiving, by a base station (BS), channel state information (CSI) in a wireless communication system may include transmitting, to a user equipment (UE), configuration information related to a CSI report, wherein the configuration information includes first information related with a time domain behavior of the CSI report, and based on the first information, one of (i) periodic, (ii) semi-persistent or (iii) aperiodic is configured as a behavior of the CSI report in the time domain, transmitting second information related with a time domain behavior of the CSI report, wherein the second information is configured for a time duration including a plurality of specific units based on a specific unit in the time domain, transmitting a reference signal for a CSI measurement, and receiving CSI in the time domain based on the first information and the second information.

In an embodiment, a base station (BS) receiving channel state information (CSI) in a wireless communication system includes one or more transceivers, one or more processors, and one or more memories storing instructions for operations executed by the one or more processors and coupled to the one or more processors. The operations may include transmitting, to a user equipment (UE), configuration information related to a CSI report, wherein the configuration information includes first information related with a time domain behavior of the CSI report, and based on the first information, one of (i) periodic, (ii) semi-persistent or (iii) aperiodic is configured as a behavior of the CSI report in the time domain, transmitting second information related with a time domain behavior of the CSI report, wherein the second information is configured for a time duration including a plurality of specific units based on a specific unit in the time domain, transmitting a reference signal for a CSI measurement, and receiving CSI in the time domain based on the first information and the second information.

In an embodiment, an apparatus includes one or more memories and one or more processors functionally coupled to the one or more memories. The one or more processors may control the apparatus to receive configuration information related to a CSI report, wherein the configuration information includes first information related with a time domain behavior of the CSI report, and based on the first information, one of (i) periodic, (ii) semi-persistent or (iii) aperiodic is configured as a behavior of the CSI report in the time domain, receive second information related with a time domain behavior of the CSI report, wherein the second information is configured for a time duration including a plurality of specific units based on a specific unit in the time domain, receive a reference signal for a CSI measurement, perform the CSI measurement based on the reference signal, and report the CSI in the time domain based on the first information and the second information.

In an embodiment, one or more non-transitory computer-readable media store one or more instructions. The one or more instructions executable by one or more processors may include instructions instructing a user equipment to receive configuration information related to a CSI report, wherein the configuration information includes first information related with a time domain behavior of the CSI report, and based on the first information, one of (i) periodic, (ii) semi-persistent or (iii) aperiodic is configured as a behavior of the CSI report in the time domain, receive second information related with a time domain behavior of the CSI report, wherein the second information is configured for a time duration including a plurality of specific units based on a specific unit in the time domain, receive a reference signal for a CSI measurement, perform the CSI measurement based on the reference signal, and report the CSI in the time domain based on the first information and the second information.

BRIEF DESCRIPTION OF THE DRAWINGS

The accompany drawings, which are included to provide a further understanding of the present disclosure and are incorporated on and constitute a part of this disclosure illustrate embodiments of the present disclosure and together with the description serve to explain the principles of the present disclosure.

FIG. 17A illustrates an example of a conventional semi-persistent CSI report behavior.

FIG. 17B illustrates an example in which a semi-persistent CSI report is indicated based on an indicator for each period, which is proposed in the present disclosure.

FIG. 18A illustrates an example of a conventional periodic CSI report behavior. FIG. 18B illustrates an example in which indication information of a bitmap form is configured in a slot unit with respect to a periodic CSI report according to a method proposed in the present disclosure.

DESCRIPTION OF EXEMPLARY EMBODIMENTS

Figure 1:
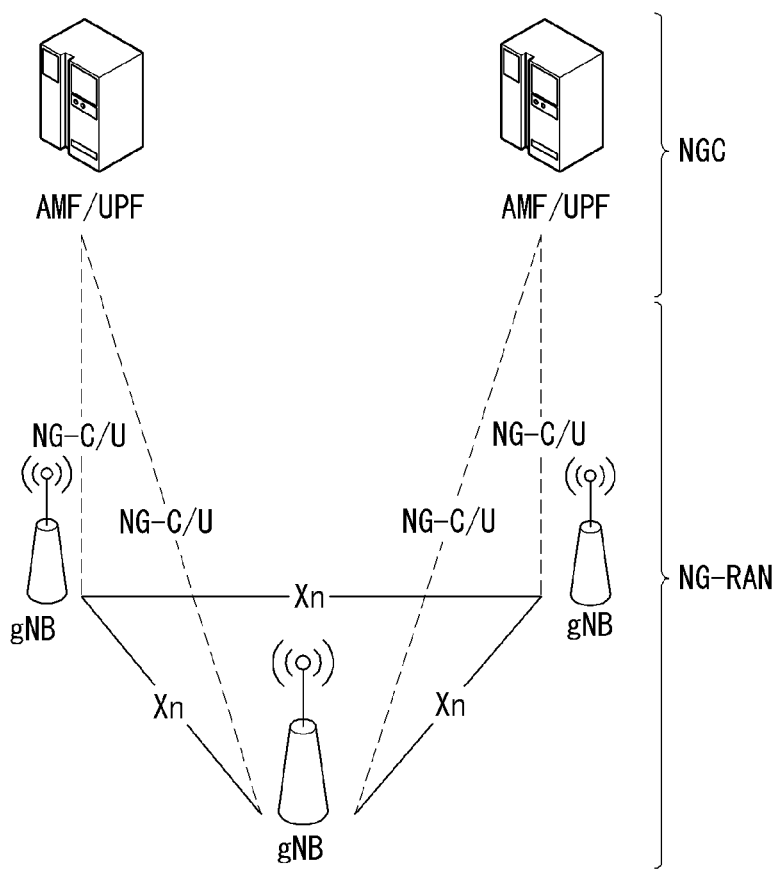
FIG. 1 is a diagram illustrating an example of an overall system structure of NR to which a method proposed in the present disclosure may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
  36.304: UE procedures in idle mode
  36.211: Physical channels and modulation
  36.212: Multiplexing and channel coding
  36.213: Physical layer procedures
  36.300: Overall description
  36.321: Medium Access Control (MAC) protocol
  36.331: Radio Resource Control (RRC)

3GPP NR
- 38.304: UE procedures in idle mode and in RRC Inactive state
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.321: Medium Access Control (MAC) protocol
- 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
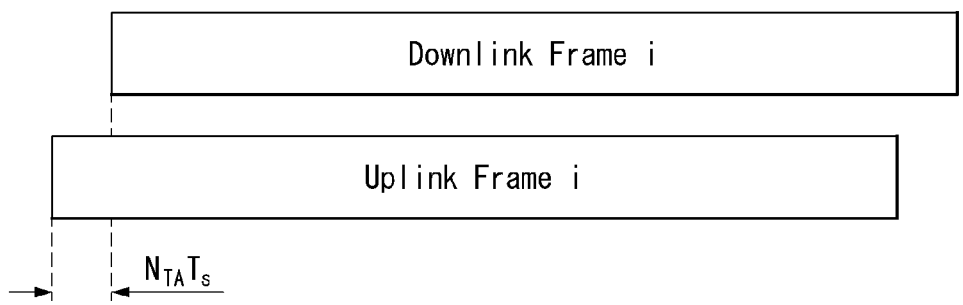
FIG. 2 illustrates a relationship between an uplink frame and a downlink frame in a wireless communication system to which a method proposed in the present disclosure may be applied.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots, \mu}-1\}$ within a radio frame. One slot consists of consecutive OFDM symbols of $N_{symb}^\mu$, and $N_{symb}^\mu$ is determined depending on a numerology used and slot configuration. The start of slots in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

Figure 3:
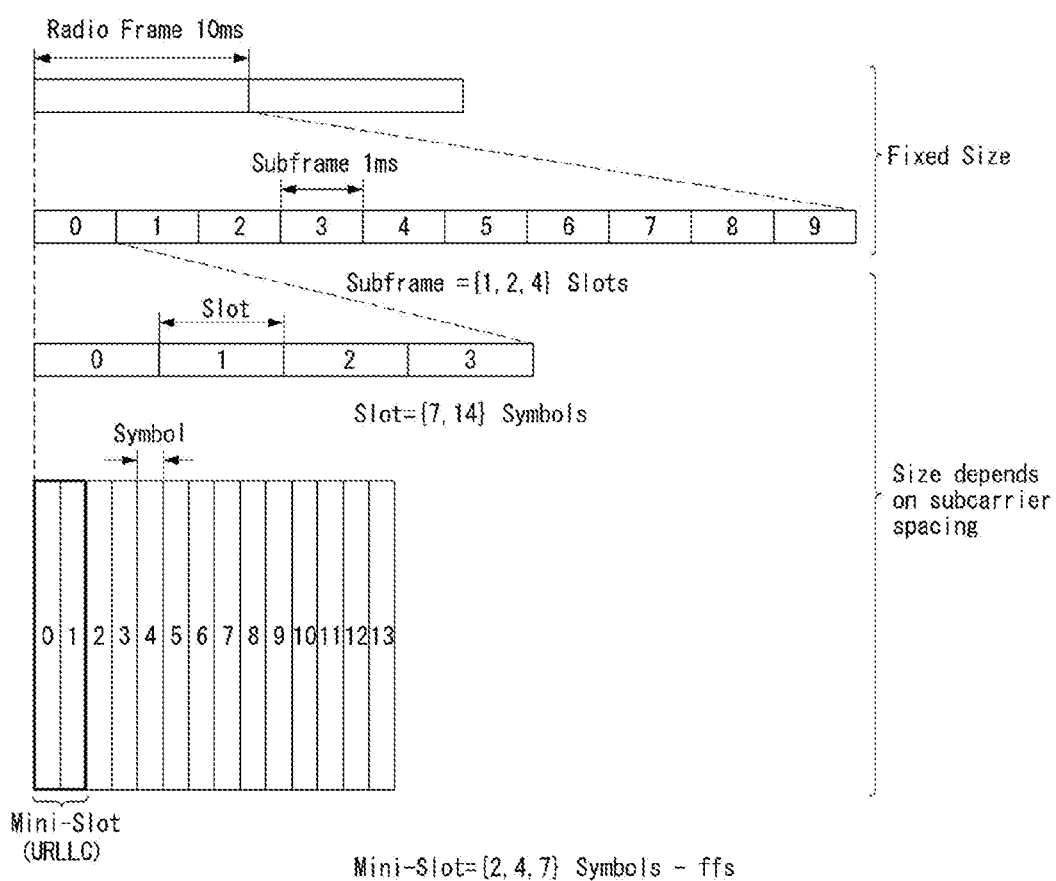
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
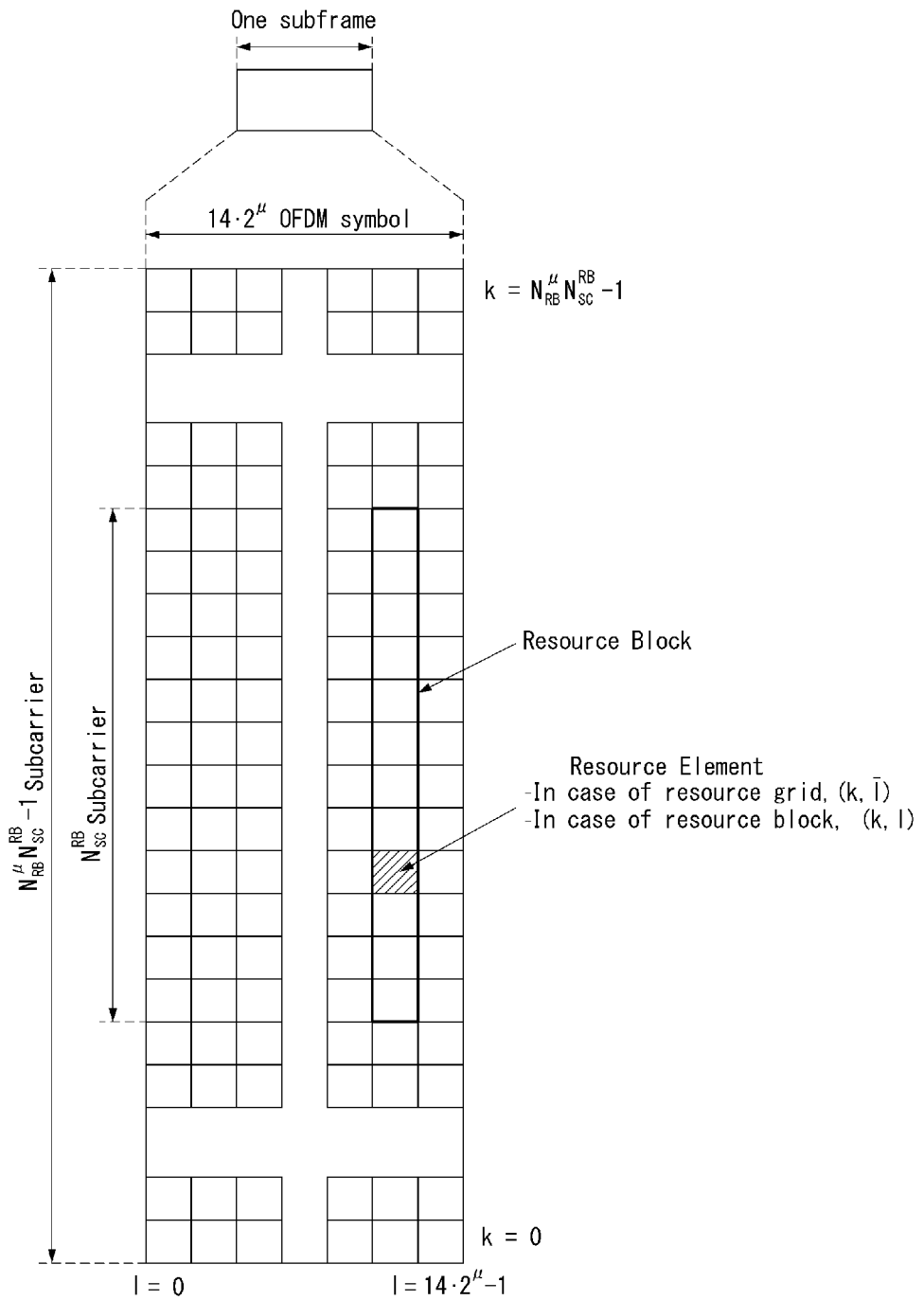
FIG. 4 illustrates an example of a resource grid supported by a wireless communication system to which a method proposed in the present disclosure may be applied.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $N_{RB}^{max, \mu}$ denotes a maximum transmission bandwidth and may change not only between numerologies but also between uplink and downlink.

Figure 5:
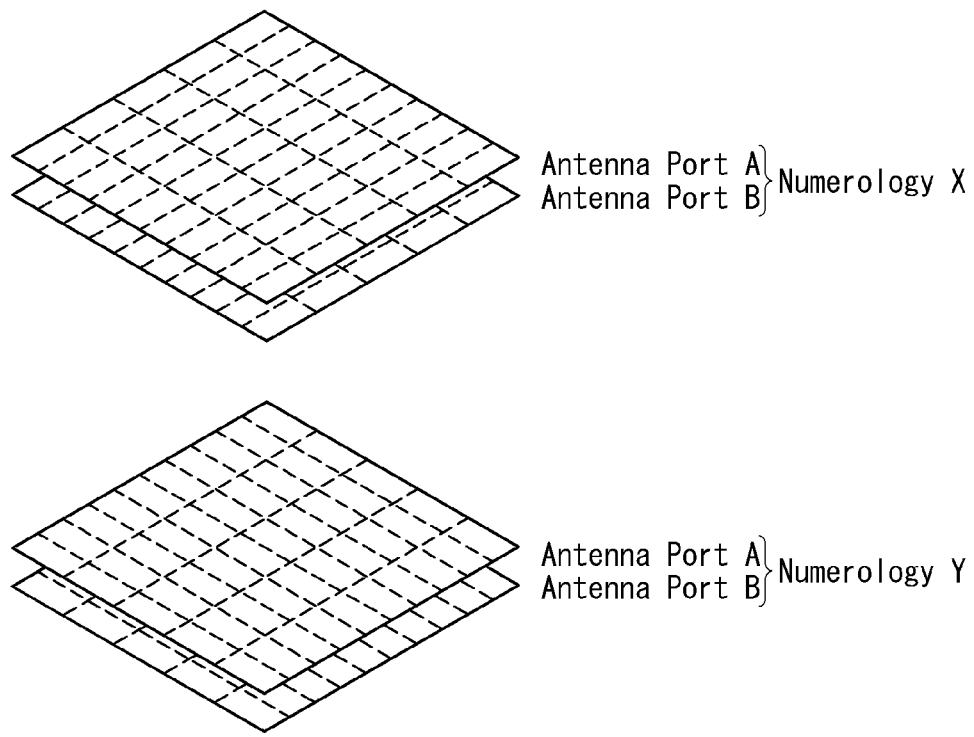
FIG. 5 illustrates examples of a resource grid for each antenna port and numerology to which a method proposed in the present disclosure may be applied.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l) for the numerology μ and the antenna port p corresponds to a complex value $a_{k,l}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP.

A relation between the physical resource block $n_{PRB}$ in BWP i and the common resource block $n_{CRB}$ may be given by the following Equation 2.

$$n_{CRB} = n_{PRB} + N_{BWP,i}^{start}$$

Here, $N_{BWP,i}^{start}$ may be the common resource block where the BWP starts relative to the common resource block 0.

Bandwidth Part (BWP)

An NR system may be supported up to a maximum of 400 MHz per one component carrier (CC). In a UE operating in such a wideband CC, if the RF for all CCs is always turned on, UE battery consumption may increase. Alternatively, when several use cases (e.g., eMBB, URLLC, Mmtc, and V2X) operating within one wideband CC are taken into consideration, a different numerology (e.g., sub-carrier spacing) may be supported for each frequency band within a corresponding CC. Alternatively, a capability for a maximum of bandwidth may be different for each UE. By taking this into consideration, a base station may instruct a UE to operate only in some bandwidths not a full bandwidth of a wideband CC. Corresponding some bandwidths are defined as a bandwidth part (BWP) for convenience sake. The BWP may be configured with resource blocks (RB) contiguous in a frequency axis, and may correspond to one numerology (e.g., sub-carrier spacing, CP length, slot or mini-slot duration).

Meanwhile, a base station may configure multiple BWPs even within one CC configured in a UE. For example, in a PDCCH monitoring slot, a BWP occupying a relatively small frequency domain may be configured. A PDSCH indicated in a PDCCH may be scheduled on a BWP greater than the BWP. Alternatively, if UEs gather in a specific BWP, for load balancing, some UEs may be configured with other BWP. Alternatively, some spectra of a full bandwidth may be excluded and BWPs on both sides may be configured within the same slot by taking into consideration frequency domain inter-cell interference cancellation between neighboring cells. That is, a base station may configure at least one DL/UL BWP in a UE associated with a wideband CC, may activate at least one DL/UL BWP of DL/UL BWP(s) configured at specific timing (by L1 signaling or MAC CE or RRC signaling). Switching may be indicated (by L1 signaling or MAC CE or RRC signaling) by another configured DL/UL BWP. Alternatively, if a timer value expires based on a timer, switching may be performed on a predetermined DL/UL BWP. In this case, an activated DL/UL BWP is defined as an active DL/UL BWP. However, if a UE is in an initial access process or in a situation, such as before an RRC connection is set up, the UE may not receive a configuration for a DL/UL BWP. In such a situation, a DL/UL BWP assumed by the UE is defined as an initial active DL/UL BWP.

Physical Channel and General Signal Transmission

Figure 6:
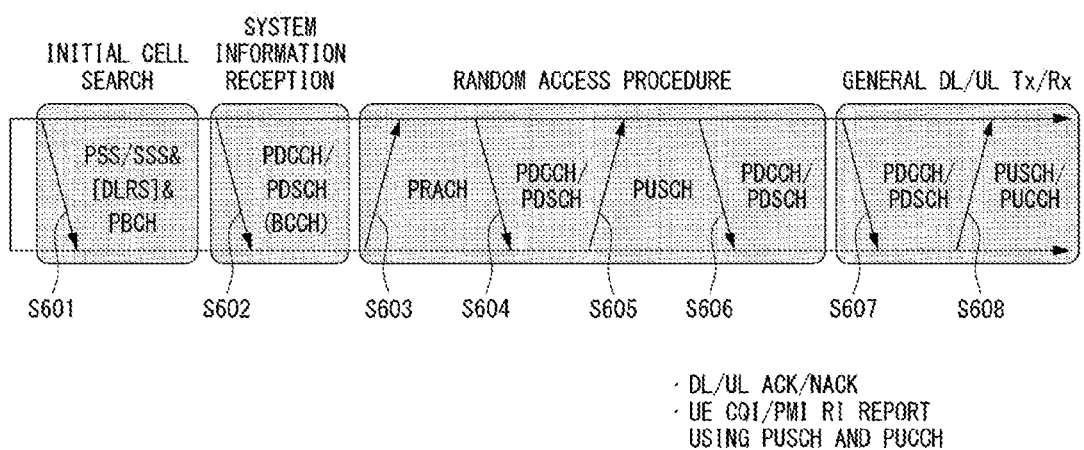
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in the NR system, the DCI format 0_0, the DCI format 0_1 is used for the scheduling of a PUSCH in one cell. The DCI format 1_0, the DCI format 1_1 is used for the scheduling of a PDSCH in one cell. Information included in the DCI format 0_0 is CRC scrambled by a C-RNTI or a CS-RNTI or an MCS-C-RNTI and is transmitted. Furthermore, the DCI format 0_1 is used to schedule a PUSCH in one cell. Information included in the DCI format 0_1 is CRC scrambled by a C-RNTI or a CS-RNTI or an SP-CSI-RNTI or an MCS-C-RNTI and is transmitted. The DCI format 1_0 is used for the scheduling of a PDSCH in one DL cell. Information included in the DCI format 1_0 is CRC scrambled by a C-RNTI or a CS-RNTI or an MCS-C-RNTI and is transmitted. The DCI format 1_1 is used for the scheduling of a PDSCH in one cell. Information included in the DCI format 1_1 is CRC scrambled by a C-RNTI or a CS-RNTI or an MCS-C-RNTI and is transmitted. The DCI format 2_1 is used to notify a PRB(s) and an OFDM symbol(s) which may be assumed that a UE has not intended transmission. Information, such as preemption indication 1, preemption indication 2, . . . , preemption indication N included in the DCI format 2_1 is CRC scrambled by an INT-RNTI and is transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

DL and UL Transmission and Reception Operation

DL Transmission and Reception Operation

Figure 7:
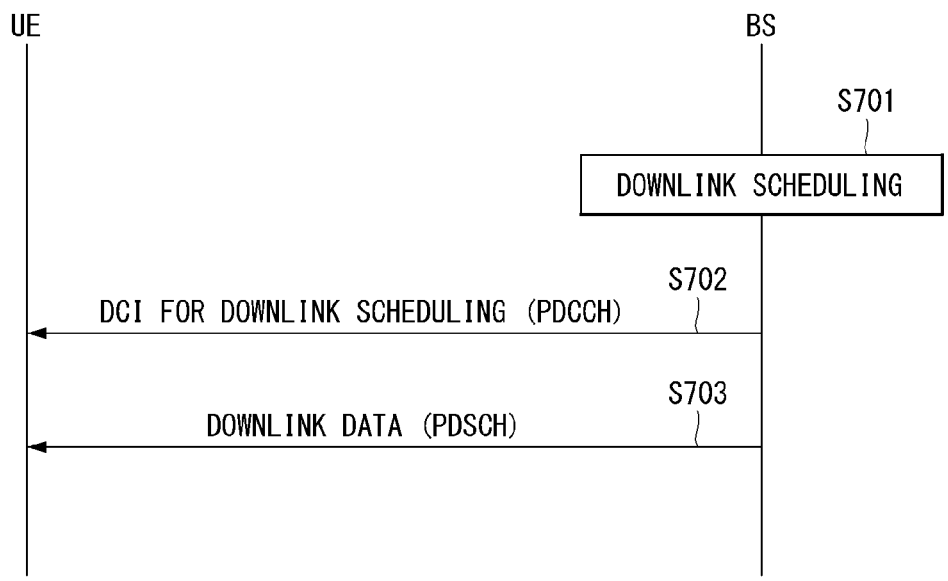
FIG. 7 is a diagram illustrating an example of a downlink transmission and reception operation.

FIG. 7 is a diagram illustrating an example of a downlink transmission and reception operation.

Referring to the FIG. 7, the eNB schedules downlink transmission such as a frequency/time resource, a transport layer, a downlink precoder, MCS, etc., (S701). In particular, the eNB may determine a beam for PDSCH transmission to the UE through the aforementioned beam management operations. The UE receives Downlink Control Information (DCI) for downlink scheduling (i.e., including scheduling information of the PDSCH) on the PDCCH (S702).

DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization, MCS (modulation and coding scheme), New data indicator, redundancy version, HARQ process number, downlink assignment index etc.

In the case of 2-codeword transmission (e.g., maxNrofCodeWordsScheduledByDCl=2), an MCS/NI/RV field may be configured for each of a TB 1 and a TB 2.

In particular, according to each state/index indicated in an antenna port(s) field, the number of DMRS ports may be scheduled, and single-user (SU)/Multi-user (MU) transmission scheduling is also available. Specifically, a table/rule for the interpretation of an antenna port(s) field value may be defined based on "dmrs-Type" and "maxLength." The number of DMRS CDM groups corresponding to one CW/two CW may be determined based on the antenna port(s) field value without a data/DMRS port(s)/number of front-load symbols. Further, a TCI field is configured with 3 bits, and a maximum of 8 TCI states are indicated according to a TCI field value to dynamically the QCL for the DMRS. The UE receives downlink data from the eNB on the PDSCH (S703). When the UE detects a PDCCH including the DCI format 1_0 or 1_1, the UE decodes the PDSCH according to the indication by the corresponding DCI.

Further, a TCI field is configured by 3 bits and a maximum of 8 TCI states are indicated according to a TCI field value to dynamically the QCL for the DMRS. The UE receives downlink data from the eNB on the PDSCH (S703). When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

A transport block may be configured with one or more code block groups (CBGs). One CBG may be configured with one or more code blocks (CBs). Furthermore, in the NR system, data transmission and reception in a CB/CBG unit may be possible in addition to data transmission and reception in a transport block unit. Accordingly, ACK/NACK transmission and retransmission in a CB/CBG unit may be possible. A UE may receive information on a CB/CBG from a base station through DCI (e.g., DCI format 0_1 or DCI format 1_1). Furthermore, the UE may receive information on a data transmission unit (e.g., TB/CB/CBG) from the base station.

UL Transmission and Reception Operation

Figure 8:
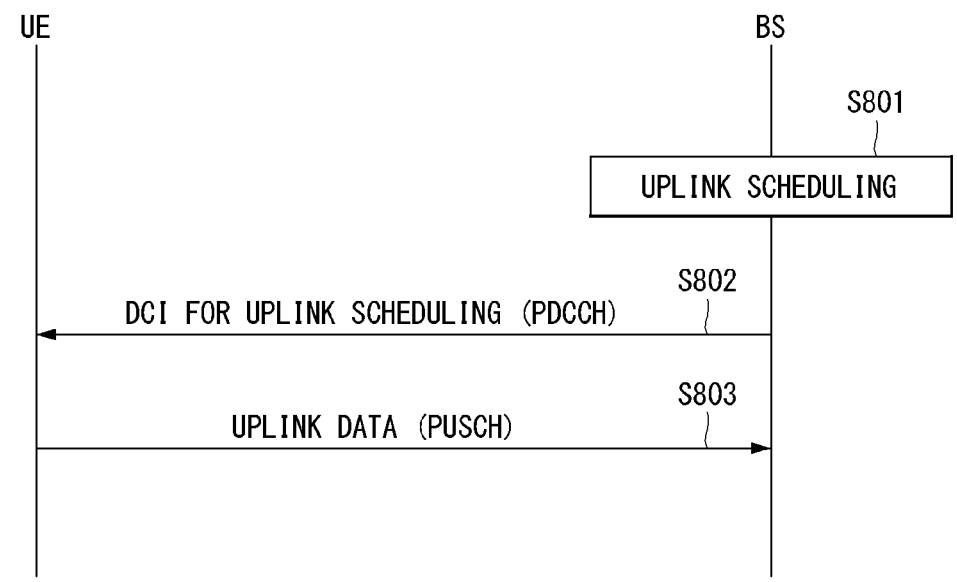
FIG. 8 is a diagram illustrating an example of an uplink transmission and reception operation.

FIG. 8 is a diagram illustrating an example of an uplink transmission and reception operation.

Referring to the FIG. 8, the eNB schedules uplink transmission such as the frequency/time resource, the transport layer, an uplink precoder, the MCS, etc., (S801). In particular, the eNB may determine a beam for PUSCH transmission of the UE through the aforementioned beam management operations. The UE receives DCI for downlink scheduling (i.e., including scheduling information of the PUSCH) on the PDCCH (S802).

DCI format 0_0 or 0_1 may be used for the uplink scheduling and in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE transmits the uplink data to the eNB on the PUSCH (S803). When the UE detects a PDCCH including DCI format 0_0 or 0_1, the UE transmits the corresponding PUSCH according to the indication by the corresponding DCI. Two transmission schemes, i.e., codebook based transmission and non-codebook based transmission are supported for PUSCH transmission.

When higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

An antenna port is defined so that a channel in which symbols on an antenna port are carried is inferred from a channel in which other symbols on the same antenna port are carried. If the property of a channel in which symbols on one antenna port are carried can be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability (e.g., maxNumberActiveTCI-PerBWP).

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

"QCL-TypeA": {Doppler shift, Doppler spread, average delay, delay spread}

"QCL-TypeB": {Doppler shift, Doppler spread}

"QCL-TypeC": {Doppler shift, average delay}

"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

The aforementioned standard contents related to QCL may be the same as Table 5 below (e.g., refer to 3gpp TS 38.214. section 5.1.5.).

TABLE 5

When the HARQ-ACK corresponding to the PDSCH carrying the activation command is
transmitted in slot n, the indicated mapping between TCI states and codepoints of the DCI
field "Transmission Configuration Indication" should be applied starting from slot n +
$3N_{slot}^{subframe,\mu}$ + 1. After a UE receives an initial higher layer configuration of TCI states and
before reception of the activation command, the UE may assume that the DM-RS ports of
PDSCH of a serving cell are quasi co-located with the SS/PBCH block determined in the
initial access procedure with respect to "QCL-TypeA", and when applicable, also with
respect to"QCL-TypeD".
If a UE is configured with the higher layer parameter tci-PresentInDCI that is set as "enabled"
for the CORESET scheduling the PDSCH, the UE assumes that the TCI field is present in
the DCI format 1_1 of the PDCCH transmitted on the CORESET. If tci-PresentInDCI is not
configured for the CORESET scheduling the PDSCH or the PDSCH is scheduled by a DCI
format 1_0, and the time offset between the reception of the DL DCI and the corresponding
PDSCH is equal to or greater than a threshold timeDurationForQCL, where the threshold is
based on reported UE capability [13, TS 38.306], for determining PDSCH antenna port quasi
co-location, the UE assumes that the TCI state or the QCL assumption for the PDSCH is
identical to the TCI state or QCL assumption whichever is applied for the CORESET used
for the PDCCH transmission.
If the tci-PresentInDCI is set as "enabled", the TCI field in DCI in the scheduling component
carrier points to the activated TCI states in the scheduled component carrier or DL BWP and
when the PDSCH is scheduled by DCI format 1_1, the UE shall use the TCI-State according
to the value of the "Transmission Configuration Indication" field in the detected PDCCH
with DCI for determining PDSCH antenna port quasi co-location. The UE may assume
that the DM-RS ports of PDSCH of a serving cell are quasi co-located with the RS(s) in the
TCI state with respect to the QCL type parameter(s) given by the indicated TCI state if the
time offset between the reception of the DL DCI and the corresponding PDSCH is equal to
or greater than a threshold timeDurationForQCL, where the threshold is based on reported
UE capability [13, TS 38.306]. When the UE is configured with a single slot PDSCH, the
indicated TCI state should be based on the activated TCI states in the slot with the scheduled
PDSCH. When the UE is configured with a multi-slot PDSCH, the indicated TCI state should
be based on the activated TCI states in the first slot with the scheduled PDSCH, and UE shall
expect the activated TCI states are the same across the slots with the scheduled PDSCH.
When the UE is configured with CORESET associated with a search space set for cross-
carrier scheduling, the UE expects tci-PresentInDci is set as "enabled" for the CORESET,
and if one or more of the TCI states configured for the serving cell scheduled by the search
space set contains "QCL-TypeD", the UE expects the time offset between the reception of
the detected PDCCH in the search space set and the corresponding PDSCH is larger than or
equal to the threshold timeDurationForQCL.
For both the cases when tci-PresentInDCI is set to "enabled" and tci-PresentInDCI is not
configured in RRC connected mode, if the offset between the reception of the DL DCI and
the corresponding PDSCH is less than the threshold timeDurationForQCL, the UE may
assume that the DM-RS ports of PDSCH of a serving cell are quasi co-located with the RS(s)
with respect to the QCL parameter(s) used for PDCCH quasi co-location indication of the
CORESET associated with a monitored search space with the lowest CORESET-ID in the
latest slot in which one or more CORESETs within the active BWP of the serving cell are
monitored by the UE. In this case, if the "QCL-TypeD" of the PDSCH DM-RS is different
from that of the PDCCH DM-RS with which they overlap in at least one symbol, the UE is
expected to prioritize the reception of PDCCH associated with that CORESET. This also
applies to the intra-band CA case (when PDSCH and the CORESET are in different
component carriers). If none of configured TCI states contains "QCL-TypeD", the UE shall
obtain the other QCL assumptions from the indicated TCI states for its scheduled PDSCH
irrespective of the time offset between the reception of the DL DCI and the corresponding
PDSCH.

Regarding to beam indication, the UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set. Initialization/update of the ID of the DL RS(s) in the RS set used for the purpose of the spatial QCL may be at least performed through explicit signaling.

The TCI-State IE associates one or two DL reference signals (RSs) with a corresponding quasi co-location (QCL) type. The TCI-State IE may include a parameter, such as a bwp-Id/reference signal/QCL type.

A bwp-Id parameter indicates a DL BWP where an RS is located. A cell parameter indicates a carrier where an RS is located. A reference signal parameter indicates a reference antenna port(s), that is, the source of a quasi co-location for a corresponding target antenna port(s) or a reference signal including the same. A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource setting information. For another example, in order to indicate QCL reference information for a PDCCH DMRS antenna port(s), a TCI state ID may be indicated in each CORESET configuration. For another example, in order to indicate QCL reference information for a PDSCH DMRS antenna port(s), a TCI state ID may be indicated through DCI.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a wireless channel (or referred to as a link) formed between the UE and the antenna port.

Figure 9:
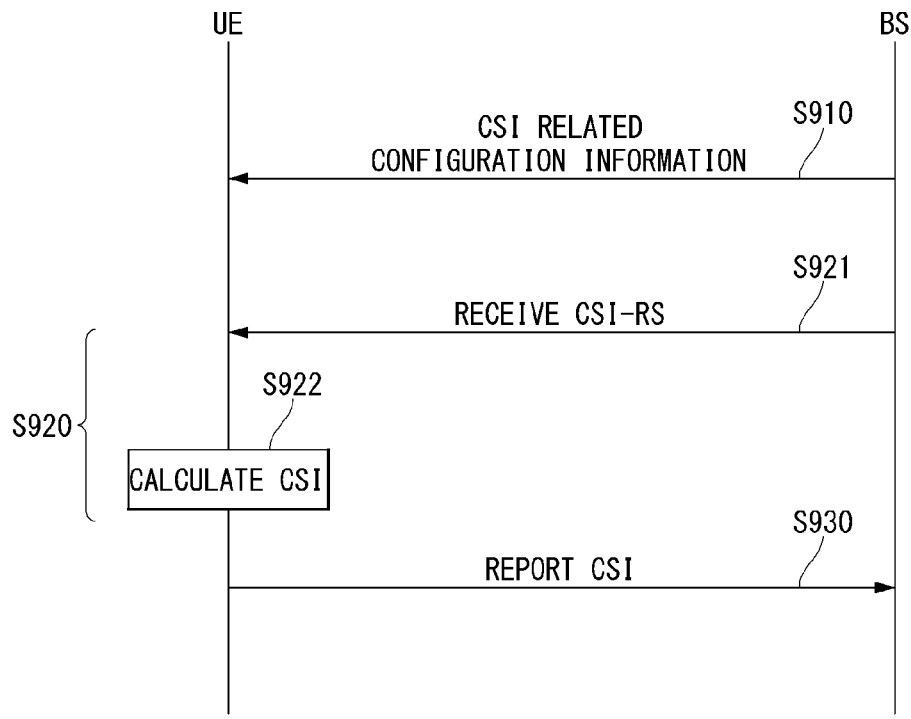
FIG. 9 is a flowchart illustrating an example of a CSI-related procedure to which a method proposed in the present disclosure may be applied.

FIG. 9 is a flowchart showing an example of a CSI associated procedure to which a method proposed in the present disclosure may be applied.

Referring to FIG. 9, in order to perform one of usages of the CSI-RS, a terminal (e.g., user equipment (UE)) receives, from a base station (e.g., general Node B or gNB), configuration information related to the CSI through radio resource control (RRC) signaling (S910).

The configuration information related to the CSI may include at least one of CSI-interference management (IM) resource related information, CSI measurement configuration related information, CSI resource configuration related information, CSI-RS resource related information, or CSI reporting configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 6 shows an example of NZP CSI-RS resource set IE. As shown in Table 6, parameters (e.g., a BM related "repetition" parameter and a tracking related "trs-Info" parameter) representing the usage may be configured for each NZP CSI-RS resource set.

TABLE 6

```
-- ASN1START
-- TAG-NZP-CSI-RS-RESOURCESET-START
NZP-CSI-RS-ResourceSet ::=            SEQUENCE {
   nzp-CSI-ResourceSetId              NZP-CSI-RS-ResourceSetId,
   nzp-CSI-RS-Resources               SEQUENCE (SIZE (1. .maxNrofNZP-CSI-RS-
ResourcesPerSet) ) OF NZP-CSI-RS-ResourceId,
   repetition                         ENUMERATED { on, off }
   aperiodicTriggeringOffset          INTEGER (0. . 4)
   trs-Info                           ENUMERATED {true}
   . . .
}
-- TAG-NZP-CSI-RS-RESOURCESET-STOP
-- ASN1STOP
```

In addition, the repetition parameter corresponding to the higher layer parameter corresponds to "CSI-RS-ResourceRep" of L1 parameter.

The CSI reporting configuration related information includes a reportConfigType parameter representing a time domain behavior and a reportQuantity parameter representing a CSI related quantity for reporting. The time domain behavior may be periodic, aperiodic, or semi-persistent.

The CSI reporting configuration related information may be expressed as CSI-ReportConfig IE and Table 7 below shows an example of CSI-ReportConfig IE.

TABLE 7

```
-- ASN1START
-- TAG-CSI-RESOURCECONFIG-START
CSI-ReportConfig : :=                   SEQUENCE {
   reportConfigId                       CSI-ReportConfigId,     OPTIONAL, -
   carrier                              ServCellIndex
- Need S
   resources ForChannelMeasurement      CSI-ResourceConfigId, OPTIONAL, -
   csi-IM-ResourcesForInterference      CSI-ResourceConfigId
- Need R
   nzp-CSI-RS-ResourcesForInterference  CSI-ResourceConfigId  OPTIONAL, -
- Need R
   reportConfigType                     CHOICE {
      periodic                             SEQUENCE {
         reportSlotConfig                     CSI-
ReportPeriodicityAndOffset,
         pucch-CSI-ResourceList               SEQUENCE (SIZE
(1. .maxNrofBWPs) ) OF PUCCH-CSI-Re-
source
      },
```

TABLE 7-continued

| | |
|---|---|
| semiPersistentOnPUCCH | SEQUENCE { |
| reportSlotConfig ReportPeriodicityAndOffset, | CSI- |
| pucch-CSI-ResourceList (1. .maxNrofBWPs) ) OF PUCCH-CSI-Resource }, | SEQUENCE (SIZE |
| semiPersistentOnPUSCH | SEQUENCE { |
| reportSlotConfig sl40, sl80, sl160, sl320}, | ENUMERATED {sl5, sl10, sl20, |
| reportSlotOffsetList Allocations) ) OF INTEGER (0. .32), | SEQUENCE (SIZE (1. . maxNrofUL- |
| p0alpha }, | P0-PUSCH-AlphaSetId |
| aperiodic | SEQUENCE { |
| reportSlotOffsetList Allocations) ) OF INTEGER (0. .32) } }, | SEQUENCE (SIZE (1. .maxNrofUL- |
| reportQuantity | CHOICE { |
| none | NULL, |
| cri-RI-PMI-CQI | NULL, |
| cri-RI-i1 | NULL, |
| cri-RI-i1-CQI | SEQUENCE { |
| pdsch-BundleSizeForCSI OPTIONAL }, | ENUMERATED {n2, n4} |
| cri-RI-CQI | NULL, |
| cri-RSRP | NULL, |
| ssb-Index-RSRP | NULL, |
| cri-RI-LI-PMI-CQI }, | NULL |

The UE measures CSI based on configuration information related to the CSI (S920).

The CSI measurement may include (1) a CSI-RS reception process (S921) and (2) a process of computing the CSI through the received CSI-RS (S922). And, detailed descriptions thereof will be described later.

For the CSI-RS, resource element (RE) mapping is configured time and frequency domains by higher layer parameter CSI-RS-ResourceMapping.

Table 8 shows an example of CSI-RS-ResourceMapping IE.

TABLE 8

| | |
|---|---|
| -- ASN1START | |
| -- TAG-CSI-RS-RESOURCEMAPPING-START | |
| CSI-RS-ResourceMapping ::= | SEQUENCE { |
| frequencyDomainAllocation | CHOICE { |
| row1 | BIT STRING (SIZE (4) ), |
| row2 | BIT STRING (SIZE (12) ), |
| row4 | BIT STRING (SIZE (3) ), |
| other | BIT STRING (SIZE (6) ), |
| }, | |
| nrofPorts | ENUMERATED {p1, p2, p4, p8, p12, p16, p24, p32} , |
| firstOFDMSymbolInTimeDomain | INTEGER (0 . . 13), |
| firstOFDMSymbolInTimeDomain2 | INTEGER (2 . . 12) |
| cdm-Type | ENUMERATED {noCDM, fd-CDM2, cdm4-FD2-TD2, cdm8-FD2-TD4}, |
| density | CHOICE { |
| | ENUMERATED {evenPRBs, oddPRBs}, |
| dot5 | NULL, |
| one | NULL, |
| three | NUL1 |
| spare | |
| }, | |
| freqBand | CSI-FrequencyOccupation, |
| . . . | |
| } | |

In Table 8, a density (D) represents a density of the CSI-RS resource measured in RE/port/physical resource block (PRB) and nrofPorts represents the number of antenna ports.

The UE reports the measured CSI to the eNB (S930).

Here, in the case where a quantity of CSI-ReportConfig of Table 8 is configured to "none (or No report)", the UE may skip the report.

However, even in the case where the quantity is configured to "none (or No report)", the UE may report the measured CSI to the eNB.

The case where the quantity is configured to "none (or No report)" is a case of triggering aperiodic TRS or a case where repetition is configured.

Here, only in a case where the repetition is configured to "ON", the UE may be skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting "CSI-ResourceConfig" includes a configuration for S≥1 CSI resource set (given by higher layer parameter csi-RS-ResourceSetList). Here, the CSI resource setting corresponds to the CSI-RS-resource-setlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to "1" with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP

CSI-RS resource(s) for interference measurement configured for one CSI reporting are "QCL-TypeD" for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConfig IE.

ii) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. SP CSI reporting has activation/deactivation which is the same as or similar to a mechanism having data transmission on SPS PUSCH.

iii) aperiodic CSI reporting is performed on a PUSCH and triggered by DCI. In this case, information related to trigger of aperiodic CSI reporting may be transferred/instructed/configured through MAC-CE.

In the case of AP CSI having an AP CSI-RS, AP CSI-RS timing is set by RRC, and timing for AP CSI reporting is dynamically controlled by DCI.

The NR does not adopt a scheme (for example, transmitting RI, WB PMI/CQI, and SB PMI/CQI in order) of dividing and reporting the CSI in multiple reporting instances applied to PUCCH-based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. And, Z' represents a minimum CSI processing time from the reception of the CSI-RS for channel/interference to the execution of the CSI reporting.

Additionally, the UE reports the number of CSIs which may be simultaneously calculated.

Discontinuous Reception Related Operation

Discontinuous Reception (DRX) means an operation mode of allowing the UE to reduce battery consumption so as for the UE to discontinuously receive a downlink channel. In other words, a UE in which the DRX is configured discontinuously receives a DL signal to reduce power consumption. A DRX operation is performed in a DRX cycle representing a time interval in which On Duration is periodically repeated and the DRX cycle includes the On Duration and a slip interval (alternatively, Opportunity for DRX). The On Duration represents a time interval which the UE monitors in order to receive the PDCCH. The DRX may be performed in a Radio Resource Control (RRC)_IDLE state (or mode), an RRC_INACTIVE state (or mode), and an RRC_CONNECTED state (or mode). In the RRC_IDLE state and the RRC_INACTIVE state, the DRX is used for discontinuously receiving a paging signal.

RRC_Idle state: State in which a wireless connection (RRC connection) is not configured between the eNB and the UE.

RRC Inactive state: State in which the wireless connection (RRC connection) is configured between the eNB and the UE, but the wireless connection is inactivated.

RRC_Connected state: State in which the wireless connection (RRC connection) is configured between the eNB and the UE.

The DRX is generally divided into Idle mode DRX, Connected DRX(C-DRX), and extended DRX, and DRX applied in the IDLE state is referred to as Idle mode DRX and DRX applied in the CONNECTED state is referred to as Connected mode DRX (C-DRX).

Extended/enhanced DRX (eDRX) as a mechanism capable of extending cycles of Idle mode DRX and C-DRX may be primarily used for application of (massive) IoT. Whether the eDRX is permitted in the Idle mode DRX may be configured by system information (e.g., SIB1). The SIB1 may include an eDRX-Allowed parameter and the eDRX-Allowed parameter is a parameter representing whether Idle mode extended DRX is permitted.

Idle Mode DRX

In the Idle mode, the UE may use the DRX in order to reduce the power consumption. One paging occasion (PO) is a subframe in which Paging-Radio Network Temporary Identifier (P-RNTI) may be transmitted on PDCCH, MPDCCH, or NPDCCH of addressing a paging message for NB-IoT. In the P-RNTI transmitted on the MPDCCH, the PO represents a start subframe of MPDCCH repetition. In the case of the P-RNTI transmitted on the NPDCCH, the PO indicates a start subframe of NPDCCH repetition when a subframe determined by the PO is not a valid NB-IoT downlink subframe. Then, a first valid NB-IoT downlink subframe after the PO is a start subframe of NPDCCH repetition.

One paging frame (PF) is one radio frame which may include one or multiple paging occasions. When the DRX is used, the UE needs to monitor only one PO per DRX cycle. One paging narrowband (PNB) is one narrowband in which the UE receives the paging message. The PF, the PO, and the PNB may be determined based on the DRX parameters provided in the system information.

Figure 10:
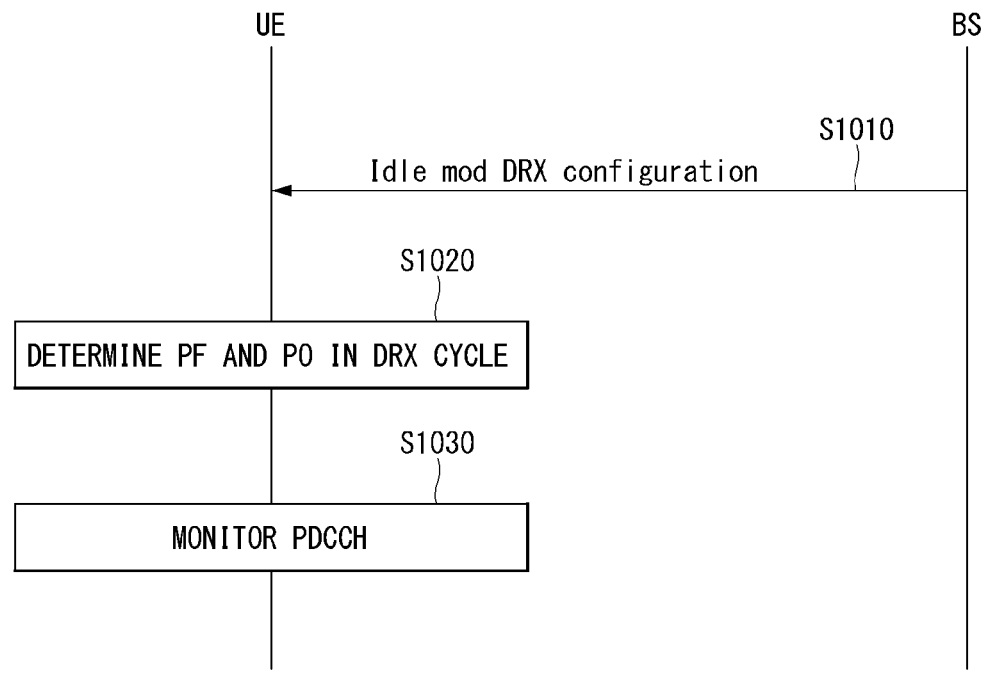
FIG. 10 is a flowchart illustrating an example of a method of performing an idle mode DRX operation.

FIG. 10 is a flowchart showing an example of a method for performing an Idle mode DRX operation.

The UE receives Idle mode DRX configuration information from the eNB through higher layer signaling (e.g., system information)(S1010).

In addition, the UE determines a Paging Frame (PF) for monitoring a physical downlink control channel (e.g., PDCCH) in a DRX cycle and a Paging Occasion (PO) in the PF based on the Idle mode DRX configuration information (S1020). Here, the DRX cycle includes On duration and a sleep interval (alternatively, Opportunity for DRX).

In addition, the UE monitors the PDCCH in the PO of the determined PF (S1030). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the eNB.

Figure 11:
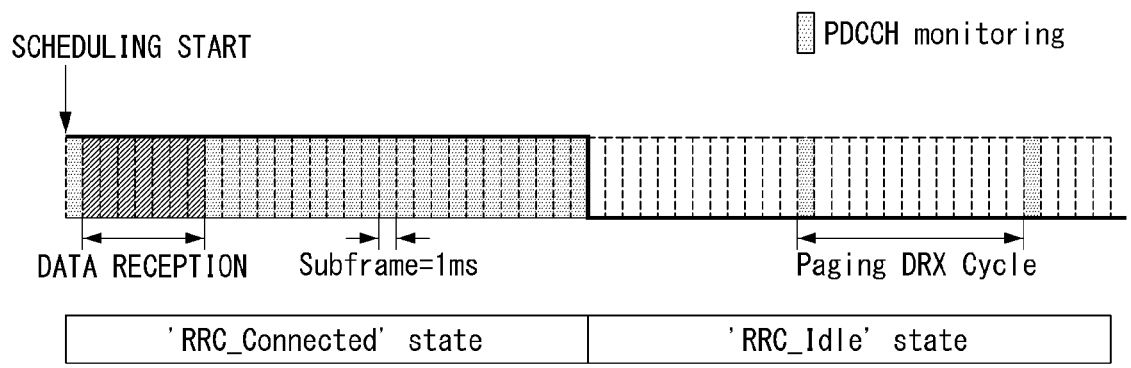
FIG. 11 is a diagram illustrating an example of an idle mode DRX operation.

FIG. 11 is a diagram illustrating an example of an Idle mode DRX operation.

Referring to FIG. 11, when traffic destined for a UE in an RRC_Idle state (hereinafter, referred to as an "Idle state") occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

Figure 12:
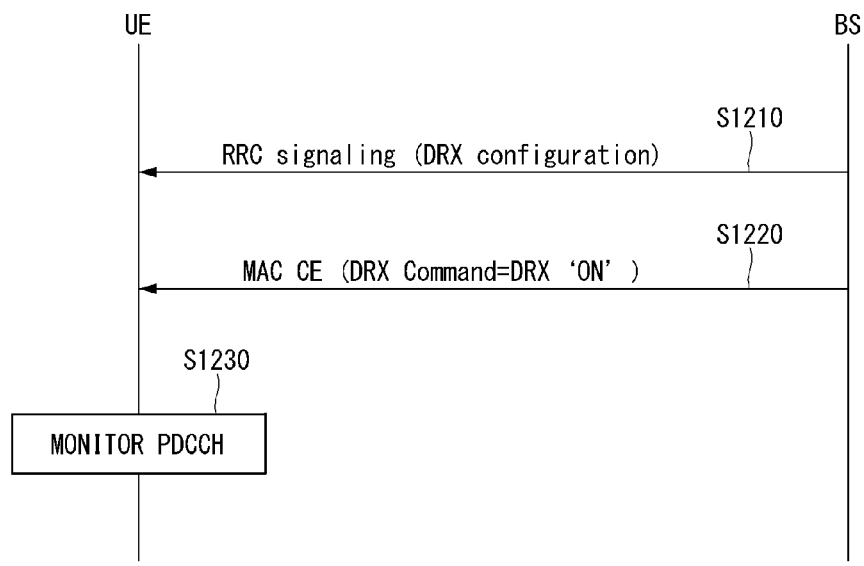
FIG. 12 is a flowchart illustrating an example of a method of performing a C-DRX operation.

FIG. 12 is a flowchart showing an example of a method for performing a C-DRX operation.

The UE receives from the eNB RRC signaling (e.g., DRX-Config IE) including DRX configuration information (S1210). The DRX configuration information may include the following information.

onDurationTimer: The number of PDCCH subframes to be continuously monitored a start part of the DRX cycle drx-InactivityTimer: The number of PDCCH subframes to be continuously monitored when the UE decodes PDCCH having scheduling information drx-RetransmissionTimer: The number of PDCCH subframes to be continuously monitored when HARQ retransmission is predicted longDRX-Cycle: On Duration occurrence cycle drxStartOffset: Subframe number in which the DRX cycle starts drxShortCycleTimer: The number of times of short DRX cycle shortDRX-Cycle: DRX cycle which operates at the number of times of drxShortCycleTimer when Drx-InactivityTimer is terminated In addition, when DRX "ON" is configured through a DRX command of MAC command element (CE) (S1220), the UE monitors the PDCCH for ON duration of the DRX cycle based on the DRX configuration (S1230).

Figure 13:
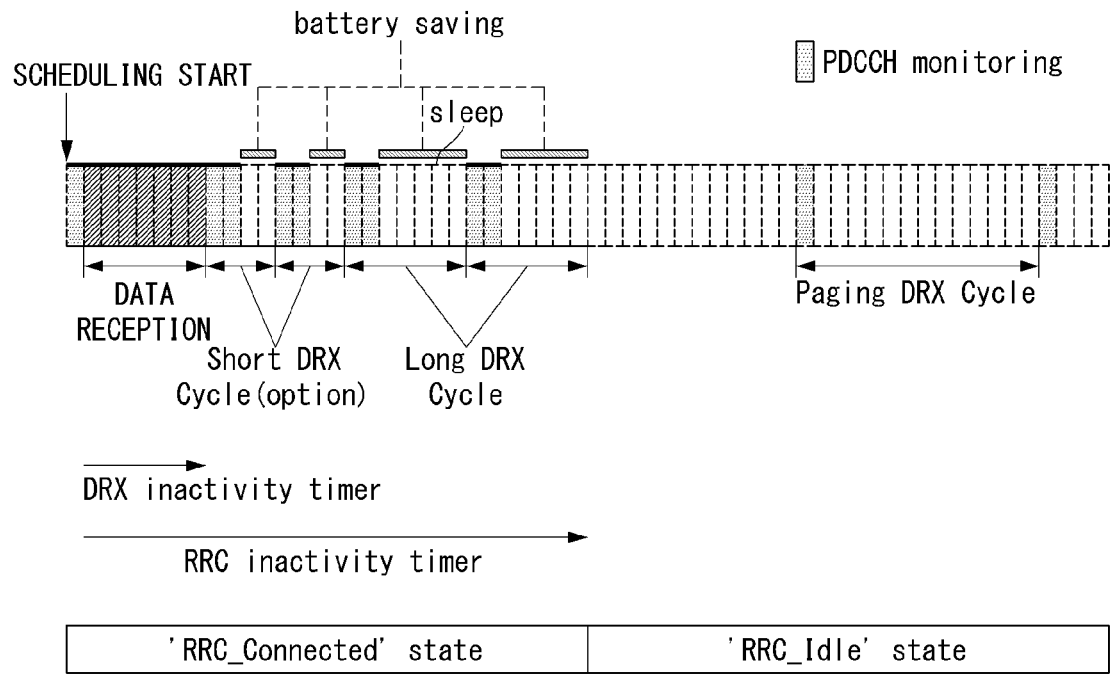
FIG. 13 is a diagram illustrating an example of a C-DRX operation.

FIG. 13 is a diagram illustrating an example of a C-DRX operation.

Referring to FIG. 13, when the UE receives scheduling information (e.g., DL Grant) in an RRC_Connected state (hereinafter, referred to as a Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

Figure 14:
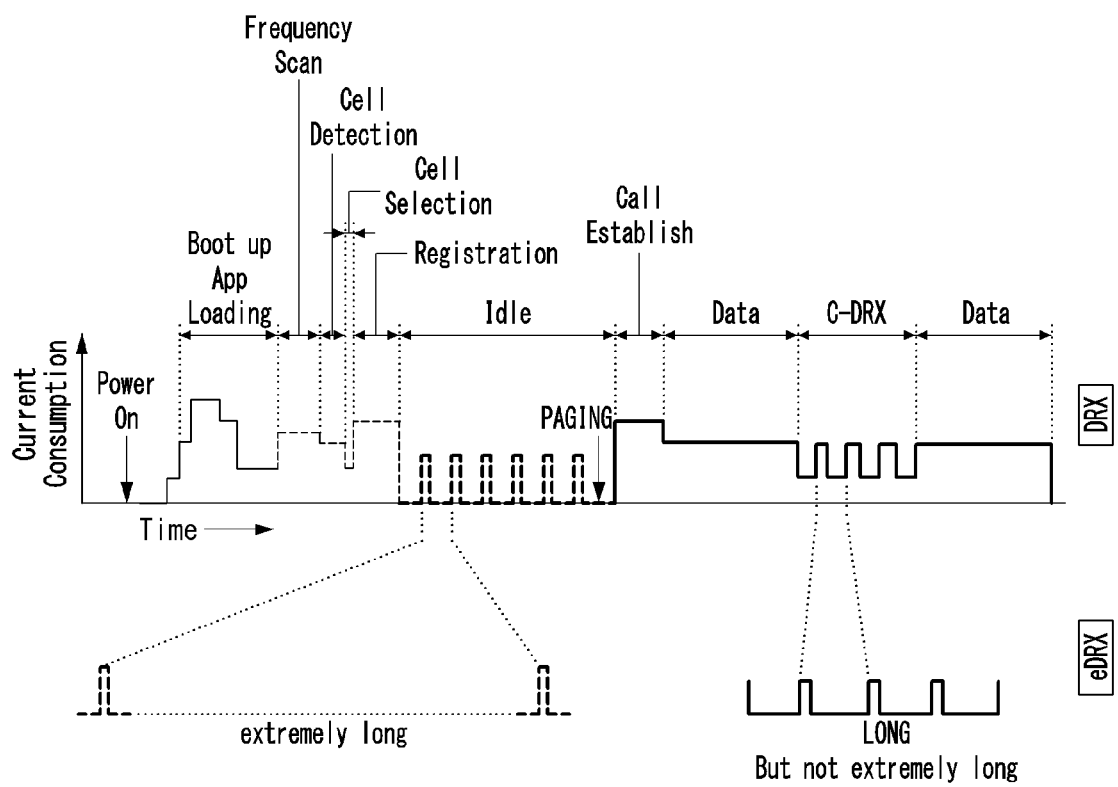
FIG. 14 is a diagram illustrating an example of power consumption according to a state of a UE.

FIG. 14 is a diagram illustrating an example of power consumption depending on a state of a UE.

Referring to FIG. 14, after power on, the UE performs Boot Up for application loading, an initial access/random access procedure for synchronizing downlink and uplink with the eNB, a registration procedure with the network, etc., and current (or power consumption) consumed while performing each procedure is illustrated in FIG. 14. When the transmission power of the UE is high, current consumption of the UE increases. In addition, when there is no traffic transmitted to the UE or to be transmitted to the eNB, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the eNB. In addition, when there is no data which the UE transmits and receives to and from the eNB in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

The aforementioned descriptions (e.g., 3GPP system, CSI-related operation, and DRX-related operation) may be combined with methods and/or embodiments proposed in the present disclosure and applied. Alternatively, the aforementioned descriptions may be supplemented to clarify technology characteristics of the methods proposed in the present disclosure. In the present disclosure, "/" may mean that all contents divided by/are included (and) or only some of the divided contents are included (or).

As described above, in a current NR system, a time domain behavior of a CSI report may be divided into three types, like a periodic, semi-persistent or aperiodic operation. Furthermore, report setting and resource setting associated for each type of each time domain behavior are configured. In such a current CSI report behavior method, the following disadvantages may be present.

In the case of the "periodic (P)" behavior, an uplink resource (e.g., PUCCH resource or PUSCH resource) of a UE may be consumed because a CSI report must be periodically performed. In the case of the "semi-persistent (SP)" behavior, an indicator for activating/deactivating a CSI report must be configured through a MAC CE or DCI. Furthermore, in the case of the "aperiodic (AP)" behavior, triggering for a CSI report must be configured through DCI. That is, signaling overhead inevitably occurs due to an indicator for a semi-persistent (SP)/aperiodic (AP) CSI report. This may become a factor to have a negative influence on system performance.

Furthermore, if a system in which relatively low mobility, such as an Internet of things (IoT) or machine type communications (MCT) scenario, is designed, even a situation in which a CSI report period between a base station and a UE is adjusted according to a communication environment or a CSI report is likely to be sparsely indicated may be supported by the existing CSI report behavior, but requires frequent signaling.

By considering such a point, the present disclosure proposes a resource configuration method for report setting (e.g., CSI-reportConfig) and resource setting (e.g., CSI-resourceConfig), for assigning flexibility to a method configuration for a CSI report and corresponding report setting. According to a method proposed in the present disclosure, effects in that signaling efficiency is increased according to a payload reduction in the signaling viewpoint and spectral efficiency in the downlink is increased may be expected.

Specifically, Proposal 1 describes a method of configuring a time domain behavior of a CSI report based on a CSI framework. Proposal 2 describes a method of configuring a time domain behavior of a CSI report by considering DRX. Proposal 1 and Proposal 2 are merely divided for convenience of description, and such a division does not limit the scope of the present disclosure. Accordingly, some configuration (e.g., Methods 1-1/1-2/1-3/1-4) of Proposal 1 may be substituted with some configuration (e.g., Methods 2-1/2-2) of Proposal 2 or they may be combined, and vice versa. Furthermore, some configurations between detailed proposal methods of Proposal 1 and/or Proposal 2 may be substituted with each other or may be combined and applied.

Furthermore, the configuration method for report setting and resource setting, proposed in the present disclosure, is described based on a CSI report, but the present disclosure is not limited thereto and may also be applied to a beam management-related report.

<Proposal 1>

Proposal 1 proposes a method of configuring indication information (or indicator) configured for each specific unit (e.g., a specific resource unit/specific time unit) in a time domain, separately from a time domain behavior (e.g., periodic/semi-persistent/aperiodic) configured through a "reportConfigType" parameter in the existing CSI reporting-related configuration (e.g., CSI-ReportConfig), and a method of performing a CSI report based on configured indication information (or indicator), as CSI framework-based methods.

Method 1-1)

As an example of a specific unit in the time domain, a method of configuring indication information (or indicator) according to a time resource unit (e.g., a slot, a sub-slot, a subframe, a half-frame, frame or a super frame) may be considered. That is, the indication information (or indicator) according to the time resource unit (e.g., a slot, a sub-slot, or a subframe, frame) may be defined. An operation of a CSI report during time domain duration indicated based on corresponding indication information (or indicator) may be configured.

The period of a CSI report behavior may be flexibly changed through the indication information (or indicator). Accordingly, there is an advantage in that system performance can be improved because a reporting operation configuration becomes more flexible compared to a time domain behavior for the existing CSI reporting and efficiency from a signaling overhead viewpoint is enhanced.

The indication information (or indicator) may be represented in a bitmap form or a value. A base station may configure the indication information (or indicator) to a UE through higher layer signaling (e.g., RRC signaling). Alternatively, the indication information (or indicator) may also be configured and indicated through MAC-CE/DCI. Furthermore, the indication information (or indicator) may be substituted with some of information included in RRC/MAC-CE/DCI or they may be combined and independently configured.

Figure 15:
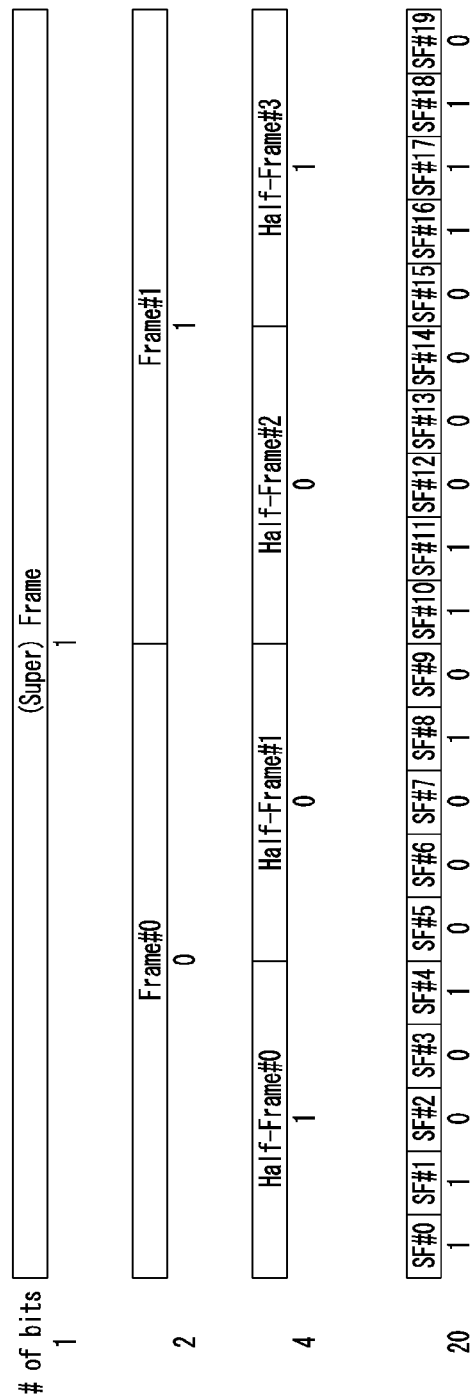
FIG. 15 is an example in which indication information (or indicator) of a bitmap form has been configured for each time resource unit according to a method proposed in the present disclosure.

FIG. 15 is an example in which indication information (or indicator) of a bitmap form has been configured for each time resource unit, which is proposed in the present disclosure. FIG. 15 is merely an example for convenience of description, and is not intended to limit the technical scope of the present disclosure.

Referring to FIG. 15, bitmap indication information (or indicator) for a frame, a half-frame, or a sub-frame, that is, a time resource unit defined in an NR system may be configured. Furthermore, a super frame may be defined as a higher concept of the frame. In this case, the bitmap indication information (or indicator) may be configured in a super frame unit. Furthermore, the bitmap indication information (or indicator) may be configured in a slot unit lower than the sub-frame.

For example, it may be assumed that the indicator is configured for each frame through RRC signaling. If an indicator value for a CSI report behavior for two frames is 10, 11, a UE may perform only a CSI report in the second frame set to "1" or indicated within the second frame. The UE may not perform a CSI report in the first frame set to "0."

Furthermore, time domain duration in which a CSI report behavior may be configured by consecutive corresponding bitmaps in a time resource unit corresponding to an indicator may be determined. For example, if 4-bit bitmap indication information (or indicator) is configured in a half-frame unit, a CSI report behavior may be performed based on a value corresponding to bitmap indication information within 4-half-frame duration.

In this case, a tradeoff may occur between a degree of freedom for CSI report setting and overhead for representing one indicator depending on a time resource unit corresponding to the indicator. In the example of FIG. 15, the most flexible operation configuration is to configure an indicator for each sub-frame based on a (super) frame, that is, time domain duration corresponding to two frames, but the number of bitmap indicators necessary for the configuration is 20 (or 20 bits). In contrast, if the indicator is configured for each half-frame, the corresponding time domain duration may be covered by relatively low overhead (e.g., 4 bitmaps), but a degree of freedom for an operation indication may be relatively reduced.

For example, a time resource unit corresponding to specific indication information (or indicator) may be configured in a way to be pre-defined or configured through higher layer signaling. For example, a specific unit of time resource units (e.g., a slot, a sub-slot, a subframe, a half-frame, frame and a super frame) may be configured through RRC/MAC-CE. If indication information of a bitmap form is received, a UE may perform a CSI report by matching each bit of indication information for each specific unit.

As a detailed example, if a specific unit is configured as a subframe and {1, 0, 1, 0} is configured as bitmap information, a UE may perform a CSI report in the first subframe and the third subframe based on the bitmap information within 4-subframe duration, and may not perform a CSI report in the second subframe and the fourth subframe.

Furthermore, during specific duration configured by indication information (or indicator) or a separate indicator, a resource setting configuration using a method associated with or independent of the existing CSI report behavior may also be possible. Even in this case, likewise, a time resource unit corresponding to the specific indicator may be configured in a way to be configured or pre-defined through higher layer signaling.

For example, one or more CSI report settings (e.g., CSI-ReportConfig) may be configured in a UE. In this case, with respect to the one or more report settings (e.g., CSI-ReportConfig) configured in the UE, all of CSI report behaviors (e.g., Method 1-1) using the indicator of the time resource unit may be configured or pre-defined to be used. Alternatively, whether the operation of Method 1-1 will be applied to a specific report setting(s) may be indicated through a separate indicator.

For example, 5 CSI report settings may be configured in a UE. The UE may be configured to perform the operation of Method 1-1 on #1, #3, and #5 report settings of the 5 CSI report settings and to perform the existing operation on the remaining #2 and #4 report settings. To this end, in addition to the indicator of the time resource unit, a report setting configuration indicator may be separately indicated in a bitmap form, like {1,0,1,0,1}. Alternatively, an indicator indicating whether the operation of Method 1-1 may be performed (or is performed) may be additionally configured for each report setting.

Method 1-2)

There is proposed a method of configuring indication information (or indicator) in a period (period) with respect to a CSI report behavior in which a time domain behavior is configured as "periodic"/"semi-persistent" and configuring an operation for a CSI report for time domain duration corresponding to the indicator(s). Indication information (or indicator) having a period as a unit may be configured through RRC/MAC-CE/DCI, and may be configured in a bitmap form. An operation of activating (ON)/deactivating (OFF) a CSI report of a specific period based on a value of indication information (or indicator) may be performed.

As in a standard discussion (e.g., 3GPP TS 38.331) related to higher layer signaling, configuration information (e.g., CSI-ReportConfig) related to a CSI report may configure PUCCH-based periodic (P)/semi-persistent (SP) reporting and PUSCH-based semi-persistent (SP)/aperiodic (AP) reporting. In relation to the configuration information (e.g., CSI-ReportConfig) related to the CSI report, reference may be made to the description related to Table 7. For example, a time domain behavior may be configured in the "reportConfigType" parameter. A period and offset for a periodic CSI report/semi-persistent CSI report based on a PUCCH may be configured through the "CSI-ReportPeriodicityAndOffset" parameter of "reportSlotConfig." The period and offset of a semi-persistent CSI report based on a PUSCH may be determined based on values configured as "reportSlotConfig" and "reportSlotOffsetList", respectively. The period of a periodic/semi-persistent CSI report may be configured with a plurality of slot units. That is, a plurality of slots may constitute one period.

For example, a case may be assumed where a "periodic" CSI report behavior is configured through "reportConfigType" parameter, one period is set to "4 slots" through a "CSI-ReportPeriodicityAndOffset" parameter, and an offset in the corresponding period is set to "1." In this case, if indication information (or indicator) having a period (configured in RRC information) as a unit is a bitmap form of "001011", each bit may correspond to the one period configured with the 4 slots, and a total of 6 periods may be configured as one specific duration. Furthermore, the "0" value may mean that a CSI report is not performed in the corresponding period and the "1" value may mean that the existing periodic reporting operation is performed in the corresponding period. That is, a UE may transmit a CSI report only in a period (i.e., $3^{rd}$, $5^{th}$ or $6^{th}$ period) corresponding to the 1 value.

Figure 16A:
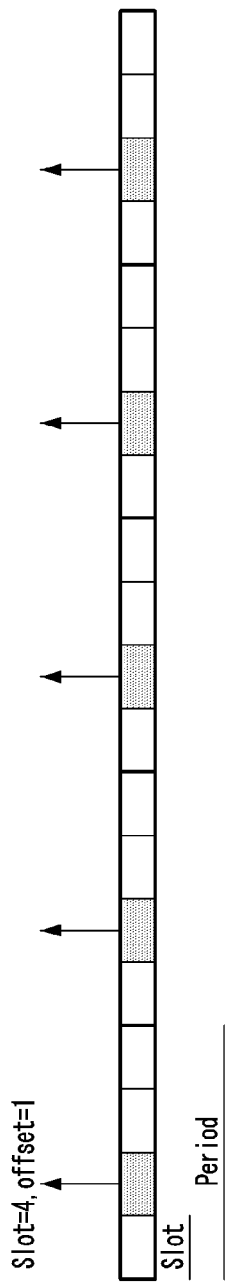
FIG. 16A illustrates an example of a conventional periodic CSI report behavior.
Figure 16B:
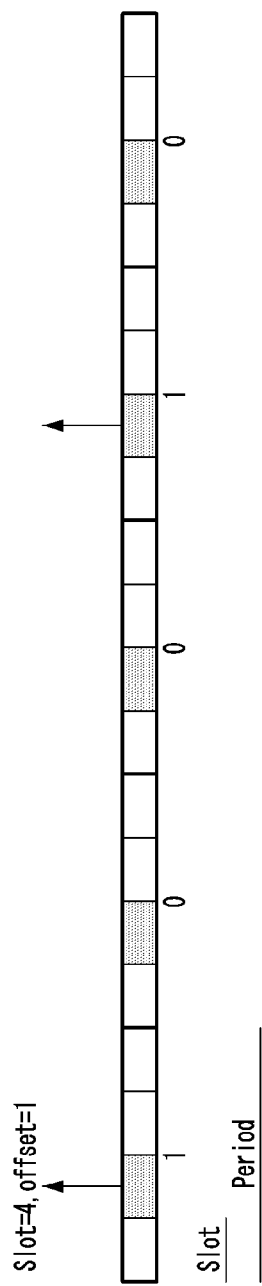
FIG. 16B illustrates an example in which a time domain behavior for CSI report based on a bitmap, proposed in the present disclosure, is configured.

FIG. 16A illustrates an example of a periodic CSI report behavior using the existing method. FIG. 16B illustrates an example in which a time domain behavior for a CSI report based on a bitmap, proposed in the present disclosure, is configured. FIGS. 16(a) and 16(b) are merely examples for convenience of description, and are not intended to limit the technical scope of the present disclosure.

In FIGS. 16A and 16B, it is assumed that a time domain behavior configured in the existing CSI report setting (e.g., CSI-ReportConfig) has been configured as "periodic." Furthermore, it is assumed that one period is "4 slots" and an offset in the corresponding period is set to "1." In FIG. 16A, a CSI report is transmitted for each period based on the CSI report setting. FIG. 16B illustrates a case where indication information (or indicator) having a period as a unit is configured in a bitmap form of "10010" through RRC information. A UE may perform a CSI report only in a period corresponding to 1 during a total of 5 periods. The UE may not transmit CSI in a period corresponding to "0" although a periodic CSI report behavior has been configured.

Accordingly, although a periodic CSI report behavior is configured through RRC signaling (e.g., "reportConfig-Type" parameter), it may be possible to indicate an aperiodic CSI report method according to a specific object of a base station or a UE based on a CSI report behavior configured based on indication information (or indicator) in a period unit.

If a semi-persistent CSI report is configured through RRC signaling (e.g., "reportConfigType" parameter), when a semi-persistent CSI report behavior is activated through indication information (or indicator) for each period configured through RRC signaling, a UE may be configured to terminate the CSI report behavior although separate deactivation indication is not present, after the UE performs a CSI report for duration according to the corresponding indicator.

FIG. 17A illustrates an example of a conventional semi-persistent CSI report behavior. FIG. 17B illustrates an example in which a semi-persistent CSI report is indicated based on an indicator for each period, which is proposed in the present disclosure. FIGS. 17A and 17B are merely examples for convenience of description, and are not intended to limit the technical scope of the present disclosure. In FIGS. 17A and 17B, the case of a semi-persistent CSI report where one period includes "4 slots" and an offset in the corresponding period is "1" is assumed.

Referring to FIG. 17A, according to the existing method, a UE transmits CSI when receiving a signal to activate a semi-persistent CSI report, and stops the transmission of the CSI when receiving a deactivation signal through an MAC-CE. In contrast, referring to FIG. 17B, a period unit indicator may be set to "111" through RRC signaling. 3 periods form specific duration D based on the indication of 3 bits, which may be represented as D=3. A UE may perform a CSI report behavior corresponding to each bit during the indicated specific duration based on the period unit indicator, and may terminate the CSI report behavior without a separate deactivation signal. In other words, according to the proposed Method 1-2 of the present disclosure, a UE may terminate a CSI report without a separate deactivation signal based on only a signal, such as RRC.

For example, as described in Method 1-1, all CSI report behaviors (e.g., Method 1-2) may be configured or/may be pre-defined to use the indicator in a time resource unit, with respect to one or more report setting (e.g., CSI-ReportConfig) configured in a UE. Alternatively, whether to apply a specific report setting(s) may be indicated through a separate indicator so that the operation of Method 1-2 is applied. Alternatively, an indicator indicating whether the operation of Method 1-2 can be performed or whether the operation of Method 1-2 is being performed for each report setting may be additionally configured. Furthermore, such a configuration may also be applied to proposal methods (e.g., Methods 1-3/1-4) to be described below.

Method 1-3)

In a CSI report behavior in which a time domain behavior is configured as "periodic"/"semi-persistent", a method of configuring indication information (or indicator) in a slot unit may be considered. That is, as an example of a specific unit in the time domain, indication information (or indicator) may be configured for each slot unit, and an operation for a CSI report may be configured. The indication information (or indicator) in the slot unit may be configured through RRC/MAC-CE/DCI.

The method of configuring indication information (or indicator) in the slot unit has more flexibility in resource indication than Method 1-1, but may increase payload for the indicator.

FIG. 18A illustrates an example of a conventional periodic CSI report behavior. FIG. 18B illustrates an example in which indication information of a bitmap form is configured in a slot unit with respect to a periodic CSI report according to a method proposed in the present disclosure. FIGS. 18A and 18B are merely examples for convenience of description, and are not intended to limit the technical scope of the present disclosure. In FIGS. 18A and 18B, the case of a periodic CSI report in one period includes "4 slots" and an offset in the corresponding period is "1" is assumed.

Referring to FIG. 18A, a CSI report is transmitted every period based on CSI report setting. Referring to FIG. 18B, indication information (or indicator) of a bitmap form may be set in a slot unit like "01000010000101001000." A UE may perform the CSI report in a slot corresponding to "1." Specifically, since the 4 slots constitute one period, the first period may correspond to "0100" bits, and the UE may transmit CSI in a slot having an index of 1. The second period may correspond to "0010" bits, and the UE may transmit CSI in a slot having an index of 6. The third period may correspond to "0001" bits, and the UE may transmit CSI in a slot having an index of 11. The fourth period may correspond to "0100" bits, and the UE may transmit CSI in a slot having an index of 13. The fifth period may correspond to "1000" bits, and the UE may transmit CSI in a slot having an index of 16.

The method of configuring indication information (or indicator) of a bitmap form in a slot unit may be interpreted as a method of adjusting an offset within a slot based on indication information (or indicator) of a bitmap form. For example, in FIG. 18B, if duration is configured with 5 periods, this means that an offset value per each period is configured as {1,2,3,1,0}.

Alternatively, an offset value per each period within the duration may be explicitly configured and indicated. That is, in addition to the offset setting based on a bitmap, an offset value per each period may be (explicitly) set through RRC information.

Method 1-2 and Method 1-3 are methods of performing a CSI report based on indication information (or indicator) configured in the "period" and "slot" units, respectively. The two methods may be independently used or may be combined and configured. For example, first indication information in the period unit and second indication information in the slot unit may be separately configured. The first indication information may be used for a CSI report behavior, and the second indication information may be used to adjust an offset within a slot. The first indication information may have a bitmap form. The second indication information may have a bitmap form or a form to indicate a specific value as an offset value per each period. That is, an offset value per each period within duration may be explicitly configured and indicated.

For example, a base station may set {00101} as the first indication information in the period unit with respect to specific duration in relation to a CSI report. Furthermore, the base station may set {3,2} in a UE as a value for offset setting for each period. The UE may set slot offsets to 3 and 2 in the third and fifth periods of a periodic CSI report, respectively, and may report CSI.

In the case of periodic reporting using the proposed indicator, an issue of a collision against the existing CSI report setting may occur. In this case, the priority of a corresponding behavior may be considered identically with an AP or an SP and indicated to operate.

Method 1-4)

With respect to a CSI report whose time domain behavior is configured as "aperiodic", indication information (or indicator) having a reporting resource as a unit may be defined, and a CSI report behavior may be configured. That is, a method of configuring, as a report resource unit, indication information (or indicator) configured for each specific unit (e.g., a specific resource unit/specific time unit) in the time domain may be considered. The indication information (or indicator) may be configured through RRC/MAC-CE/DCI. Furthermore, the indication information (or indicator) may have a bitmap form or may be represented as a specific value. A reporting resource and/or a unit of the reporting resource may be configured or pre-defined through higher layer signaling.

The method of Method 1-4 may be suitable for an aperiodic CSI report that is triggered and operated by DCI. A base station may indicate multiple AP reporting operations for a UE through indication information (or indicator) in a report resource unit, which is configured based on triggered timing.

Figure 19A:
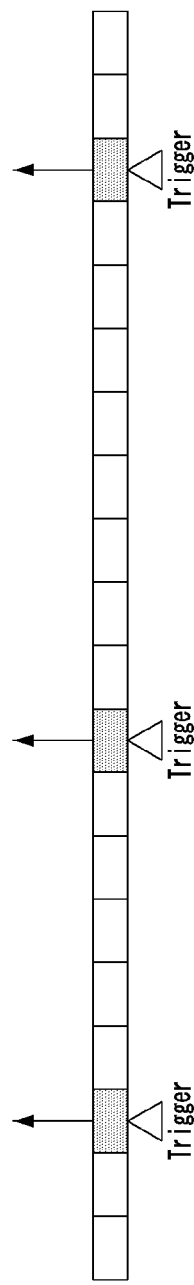
FIG. 19A illustrates an example in which an aperiodic CSI report is performed based on DCI triggering according to the existing method.
Figure 19B:
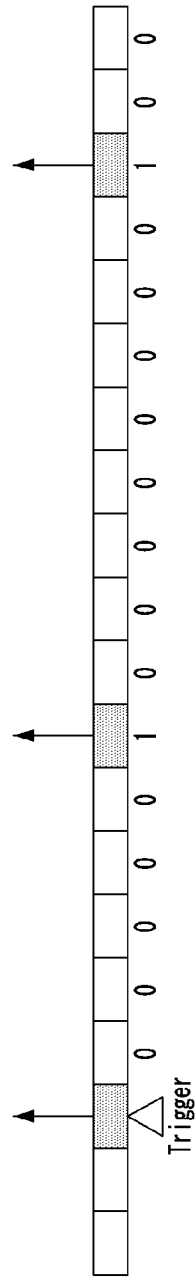
FIG. 19B illustrates an example in which an indicator indicative of a CSI report in a report resource unit is configured in a bitmap form with respect to an aperiodic CSI report and the CSI report is performed according to a method proposed in the present disclosure.

FIG. 19A illustrates an example in which an aperiodic CSI report is performed based on DCI triggering according to the existing method. FIG. 19B illustrates an example in which an indicator indicative of a CSI report in a report resource unit is configured in a bitmap form with respect to an aperiodic CSI report and the CSI report is performed according to a method proposed in the present disclosure. FIGS. 19A and 19B are merely examples for convenience of description, and are not intended to limit the technical scope of the present disclosure.

Referring to FIG. 19A, if an aperiodic CSI report is triggered three times within specific duration, there is signaling overhead because DCI must be also configured three times. In contrast, referring to FIG. 19B, a report resource unit is configured as a slot level, and corresponding indication information (or indicator) may be set to "00000100000000100" in a bitmap form. A UE may be configured to perform an aperiodic (AP) CSI report, without a separate DCI triggering operation, in a slot whose bitmap is represented as "1" from the first triggering timing.

If an aperiodic CSI report is configured based on the indicator of a bit map form according to the proposed Method 1-4, there is an effect in that corresponding indication information (or indicator) may be configured regardless of a DCI format.

<Proposal 2>

Proposal 2 proposes a method of configuring/indicating a CSI report behavior by considering a DRX cycle of a DRX operation. In order to describe the method of Proposal 2, the aforementioned DRX-related operation description may be referred and used.

The DRX operation is performed in a DRX cycle indicative of time duration in which on duration is periodically repeated. The DRX cycle includes on duration and sleep interval (or opportunity for DRX).

Figure 20:
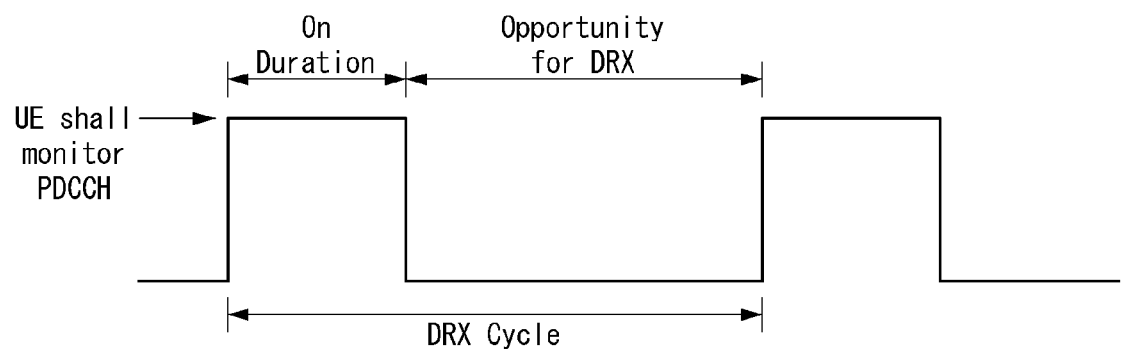
FIG. 20 illustrates an example of a DRX cycle.

FIG. 20 illustrates an example of a DRX cycle. In FIG. 20, "on duration" means time duration in which a UE monitors a PDCCH in order to receive a PDCCH. An opportunity for DRX (or sleep interval) means time duration (i.e., sleep interval) in which the UE does not monitor a PDCCH. The UE may receive, from a base station, DCI for uplink scheduling on a PDCCH during the "ON duration."

A method of indicating a time domain behavior of a CSI report (i.e., periodic/semi-persistent/aperiodic) in synchronization with a situation in which DRX is "ON duration" based on the DRX cycle may be considered. Accordingly, indication for a corresponding time domain behavior of a CSI report can be more flexibly configured.

Hereinafter, this is specifically described in Method 2-1 and Method 2-2. A UE may receive, from a base station, an indication/configuration for parameters (or control information) defined or configured to perform methods (e.g., Methods 2-1/2-2) of Proposal 2 through a method described below. Furthermore, a UE and/or a base station may be configured to transmit paging in DRX based on corresponding parameters and then perform methods (e.g., Methods 2-1/2-2) of Proposal 2.

Method 2-1)

As in Proposal 1 (e.g., Methods 1-1/1-2/1-3/1-4), a DRX cycle for a DRX operation may be additionally considered, in relation to the method of indicating a CSI report behavior based on indication information (or indicator) configured for each specific unit (e.g., a specific resource unit/specific time unit) in the time domain. In other words, the operation of configuring a specific unit (e.g., a specific resource unit/specific time unit) in the time domain, related to the CSI report setting and/or resource setting of Proposal 1 (e.g., Methods 1-1/1-2/1-3/1-4), may be performed in association with "ON duration" of a DRX cycle.

For example, indication information (or indicator) for each specific unit (e.g., a specific resource unit/specific time unit) in the time domain may be configured through a MAC CE or DCI. A base station may configure a CSI report behavior using time resource unit indication information (or indicator) configured based on DCI or MAC CE on a PDCCH to be monitored by a UE.

An operation of configuring a CSI reporting method in association with "ON duration" of DRX may be different depending on a wireless connection (RRC connected) of a UE.

For example, in the case of Idle mode DRX (e.g., refer to FIG. 10 and related description), a UE may monitor a PDCCH based on Idle mode DRX configuration information configured through higher layer signaling (e.g., system information). Accordingly, if a CSI report is configured using a time resource unit indicator, a base station may need to first configure corresponding indication information (or indicator) in a UE through DCI on a PDCCH. When the UE receives the PDCCH during "on duration", the UE may shift to an RRC_Connected state, and may transmit and receive data to and from the base station. In this case, the CSI report may be indicated to operate using the time resource unit indicator related to the CSI report configured in RRC. Accordingly, the indicator configured with DCI may be substituted and updated with the indicator configured with RRC.

For example, in the case of Connected mode DRX (e.g., refer to FIG. 12 and related description), in the state in which DRX configuration information has already been received through RRC signaling (e.g., DRX-Config IE), when DRX "ON" is configured through a DRX command of a MAC CE, a UE may monitor a PDCCH during the "ON duration" based on the DRX configuration information. In this case, when a PDCCH is successfully detected, if indication information (or indicator) in a time resource unit for CSI report setting is included in corresponding DCI, an operation of substituting indication information (or indicator) of a time resource unit configured through RRC may be configured. In other words, the indication information (or indicator) of the time resource unit configured through RRC may be updated with indication information (or indicator) of the time resource unit for the CSI report setting included in the DCI. Alternatively, as a corresponding indicator is configured in the MAC CE, the CSI report behavior already configured based on the time resource unit indicator may be performed.

For example, a base station may configure the aforementioned time resource unit indicator through RRC/MAC-CE/DCI. Accordingly, when the indicator is configured and indicated through each signaling(s), a method of representing whether to use the existing indicator through a separate indicator or designating a default operation of substituting the existing indicator with a time resource unit indicator that has been explicitly most recently configured may be considered.

Furthermore, if a DRX cycle is very long, a scheme indicative of a configuration for a PUCCH beam operation including CSI and a PUCCH beam may be necessary. For example, a UE be configured to operate, assuming a (default) beam configuration based on the most recently used PUCCH beam, a pre-defined beam index and/or the lowest/highest beam index.

Method 2-2)

Method 2-2 proposes a method of defining indication information (or indicator) having a DRX cycle(s) as a unit and configuring a CSI report behavior. Method 2-2 may be similar to Method 2-1 in that it performs a CSI report behavior based on (in synchronization with) DRX "ON duration", but is different from Method 2-1 in that it additionally configures indication information (or indicator) of a bitmap form having a DRX cycle(s) as a unit.

For example, indication information (or indicator) of a DRX cycle unit configured in a bitmap form may be configured through higher layer signaling (e.g., RRC signaling). That is, each bit of the indication information (or indicator) of a bitmap form may be set in a DRX cycle unit.

For example, when a value (or bit) of the indicator is "1", a UE may perform a periodic/semi-persistent/aperiodic CSI report according to a time domain behavior configured through RRC (e.g., reportConfigType within CSI-ReportConfig) only for duration corresponding to "on duration" of a DRX cycle in which a corresponding indicator has been configured.

Figure 21:
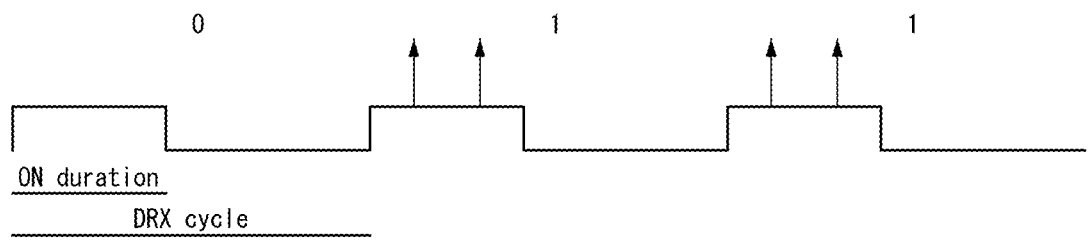
FIG. 21 illustrates an example in which indication information for a CSI report in a DRX cycle unit is configured, which is proposed in the present disclosure.

FIG. 21 illustrates an example in which indication information for a CSI report in a DRX cycle unit is configured, which is proposed in the present disclosure. FIG. 21 is merely an example for convenience of description and is not intended to limit the technical scope of the present disclosure.

Referring to FIG. 21, a bitmap indicator configured through RRC information is "011", and each bit may correspond to one DRX cycle. In this case, a configuration for a bit-to-DRX cycle may be configured or pre-defined through a higher layer. According to the indicator, for duration in which DRX is performed three times, a UE may be configured to report CSI to a base station using a CSI reporting method pre-configured/indicated in the second and third DRX "ON duration."

The operation of Method 2-2 may be performed independently of the operation of Proposal 1 (e.g., Methods 1-1/1-2/1-3/1-4) or at least one of them may be combined and performed.

For example, indication information (or indicator) having a DRX cycle(s) as a unit and indication information (or indicator) having a period as a unit may be separately configured. Referring to the example of FIG. 16B, a case may be assumed where a "periodic" CSI report behavior is configured through a "reportConfigType" parameter, and one period is set to "4 slots" and an offset in the corresponding period is set to "1" through a "CSI-ReportPeriodicityAndOffset" parameter. Assuming that indication information (or indicator) having a period as a unit is set to "001011" in a bitmap form and a DRX cycle is repeated in a 2-period length unit, it is assumed that indication information (or indicator) having the DRX cycle(s) as a unit is set to "010." In this case, in the second DRX cycle, a CSI report for the third period may be transmitted during a DRX "on duration." Furthermore, in the third DRX cycle, a UE may not transmit a CSI report in the fifth and sixth periods because a bit value has been set to "0."

A time domain behavior of a CSI report may be flexibly changed through the aforementioned proposal methods (e.g., Methods 1-1/1-2/1-3/1-4 of Proposal 1, Methods 2-1/2-2 of Proposal 2). In other words, a CSI report behavior has been configured using the three types of conventional time domain behaviors (e.g., periodic, aperiodic, and semi-persistent), but a CSI report behavior in the time domain may be configured variously and flexibly, such as that an aperiodic CSI report is repeated periodically or semi-persistently through the aforementioned proposal methods. Furthermore, an effect in that efficiency is improved even from a signaling overhead viewpoint through the aforementioned proposal methods (e.g., Methods 1-1/1-2/1-3/1-4 of Proposal 1, Methods 2-1/2-2 of Proposal 2) may be expected. Some configurations of the aforementioned proposal methods may be substituted with some configurations of other proposal methods or they may be mutually combined and applied and may be independently applied. Furthermore, the aforementioned proposal methods (e.g., Methods 1-1/1-2/1-3/1-4 of Proposal 1, Methods 2-1/2-2 of Proposal 2) may also be extended and applied to a beam report (e.g., L1-RSRP) for beam management in addition to a CSI report.

Figure 22:
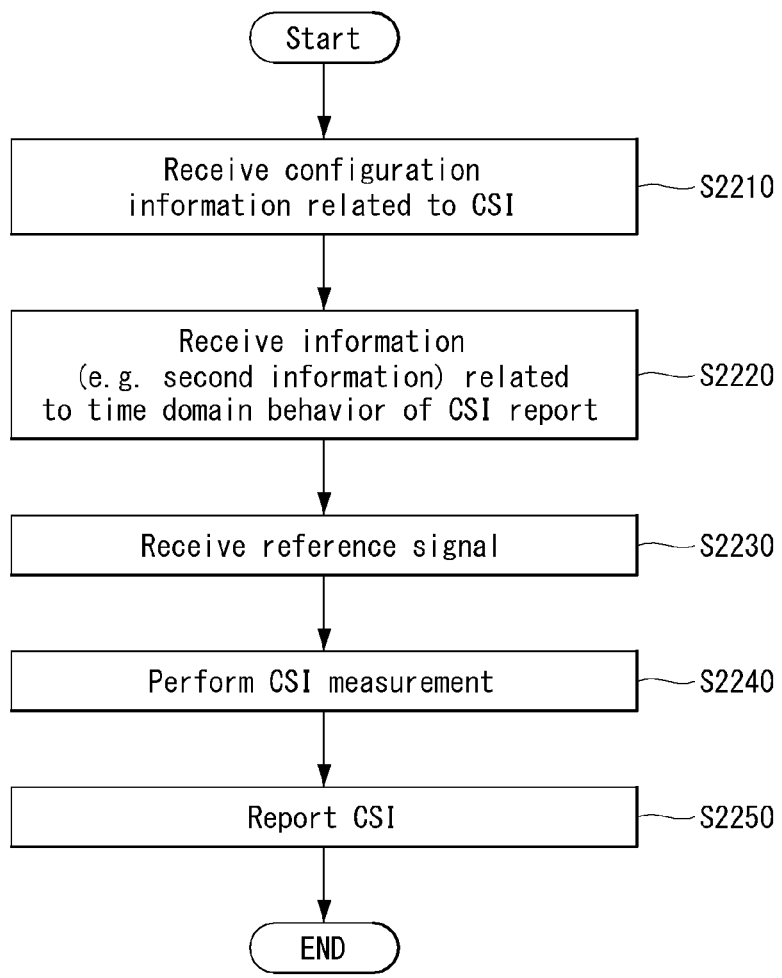
FIG. 22 illustrates an example of a flowchart of an operation of performing, by a UE, data transmission and reception to which a method and/or embodiment proposed in the present disclosure may be applied.

FIG. 22 illustrates an example of an operating flowchart of an operation of reporting, by a user equipment (UE), CSI, to which the methods (e.g., Proposal 1/Proposal 2) proposed in the present disclosure may be applied. FIG. 22 is merely for convenience of description, and does not limit the scope of the present disclosure. Furthermore, some step(s) illustrated in FIG. 22 may be omitted depending on a situation and/or a configuration.

For example, the UE may include one or more transceivers, one or more processors, and one or more memories connected to the one or more processors and for storing instructions for operations executed by the one or more processors.

The UE may receive, from a base station, configuration information related to CSI (S2210). The configuration information related to CSI may include CSI resource setting, CSI measurement setting, CSI-RS resource setting, CSI report setting, etc. The configuration information may be received through higher layer signaling (e.g., RRC). The configuration information may include pieces of information related to the methods and/or embodiments described in the aforementioned methods (e.g., Proposal 1/Proposal 2).

For example, the configuration information related to CSI may include configuration information (e.g., CSI-ReportConfig) related to a CSI report. That is, the UE may receive configuration information related to a CSI report. Configuration information (e.g., CSI-ReportConfig) related to one or more CSI reports may be configured in the UE. The configuration information (e.g., CSI-ReportConfig) related to a CSI report may include information (e.g., first information)

related with a time domain behavior of the CSI report. For example, the information (e.g., first information) related with the time domain behavior may correspond to a report configuration type (reportConfigType) parameter. A CSI report behavior in the time domain may be configured as one of (i) periodic, (ii) semi-persistent or (iii) aperiodic based on the information (e.g., first information) related with the time domain behavior.

For example, the configuration information (e.g., CSI-ReportConfig) related to a CSI report may include a report quantity (reportQuantity) parameter indicative of a CSI-related quantity for reporting. Report content, such as a CRI, a PMI, a CQI, and an L1-RSRP, may be configured through the report quantity (reportQuantity) parameter. Furthermore, the configuration information (e.g., CSI-ReportConfig) related to a CSI report may include period and slot offset information of the CSI report.

For example, the operation of receiving, by the UE (e.g., 100/200 in FIGS. 24 to 28), the configuration information related to a CSI report at step S2210 may be implemented by an apparatus of FIGS. 24 to 28 to be described later. For example, referring to FIG. 25, the one or more processors 102 may control the one or more transceivers 106 and/or the one or more memories 104 to receive the configuration information. The one or more transceivers 106 may receive the configuration information.

The UE may receive information (e.g., second information) related with a time domain behavior of a CSI report (S2220). The second information may correspond to indication information (or indicator) configured for each specific unit (e.g., a specific resource unit/specific time unit) in the time domain described in the aforementioned proposal methods (e.g., Proposal 1/Proposal 2). The second information may be configured through higher layer signaling (e.g., RRC signaling)/MAC-CE/DCI.

For example, the second information may be configured for time duration including a plurality of specific units based on a specific unit in the time domain. That is, the time duration is configured with the plurality of specific units continuous in the time domain, and the second information may be configured for the corresponding time interval.

For example, the second information may be a bitmap form. Each bit of the bitmap may correspond to each of the plurality of specific units. For example, the specific unit may be configured using one of a slot, a subframe, a half-frame or a frame as a unit. Alternatively, the specific unit may have a period (i.e., the period of a CSI reporting) as a unit. Alternatively, the specific unit may correspond to a DRX cycle. In other words, the second information may be configured in a bitmap form configured with bits corresponding to a specific unit (e.g., a slot, a sub frame, a half-frame, a frame, a period or a DRX cycle) unit. The UE may receive information for the specific unit from the base station.

For example, the time duration may be determined based on the number of bits of the bitmap. Since each bit of the bitmap may correspond to each specific unit, the time duration may be determined based on the number of plurality of specific units.

For example, the second information may be configured for time duration including a plurality of slots based on a slot unit in the time domain. An offset value per each period for a periodic CSI report behavior may be determined based on the second information.

For example, if one or more CSI report settings (e.g., CSI-ReportConfig), that is, configuration information related to one or more CSI reports, is configured in the UE, whether to apply the second information to configuration information related to all of the CSI reports or to configuration information related to a specific (some) CSI report may be further indicated.

For example, the operation of receiving, by the UE (e.g., 100/200 in FIG. 24), the information (e.g., second information) related with the time domain behavior of a CSI report at step S2220 may be implemented by the apparatus of FIGS. 24 to 28 to be described later. For example, referring to FIG. 25, the one or more processors 102 may control the one or more transceivers 106 and/or the one or more memories 104 to receive the information (e.g., second information) related with the time domain behavior of a CSI report. The one or more transceivers 106 may receive the information (e.g., second information) related with the time domain behavior of a CSI report.

The UE may receive a reference signal for a CSI measurement (S2230). For example, the reference signal may be a CSI-RS. The reference signal may be received periodically, aperiodically or semi-persistently.

For example, the operation of receiving, by the UE (e.g., 100/200 in FIG. 24), the reference signal at step S2230 may be implemented by the apparatus of FIGS. 24 to 28 to be described later. For example, referring to FIG. 25, the one or more processors 102 may control the one or more transceivers 106 and/or the one or more memories 104 to receive the reference signal. The one or more transceivers 106 may receive the reference signal.

The UE may perform the CSI measurement based on the reference signal (S2240). The UE may compute CSI by measuring a channel based on the reference signal. The UE may perform the CSI measurement based on a CSI-RS resource(s) for a channel measurement and a CSI-IM/NZP CSI-RS resource(s) for an interference measurement.

For example, the operation of performing, by the UE (e.g., 100/200 in FIG. 24), the CSI measurement at step S2240 may be implemented by the apparatus of FIGS. 24 to 28 to be described later. For example, referring to FIG. 25, the one or more processors 102 may control the one or more transceivers 106 and/or the one or more memories 104 to perform the CSI measurement.

The UE may report CSI to the base station (S2250). The CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI) or an L1-RSRP.

For example, the UE may transmit the CSI in the time domain based on the first information related with a time domain behavior of a CSI report and the second information (e.g., indication information configured for each specific unit (e.g., a specific resource unit/specific time unit) in the time domain). A periodic, semi-persistent or periodic CSI report behavior may be configured based on the first information. Furthermore, the second information of a bitmap form may be configured, a CSI reporting may be transmitted in a specific unit corresponding to bits corresponding to 1 in the bitmap, and a CSI report may not be transmitted in a specific unit corresponding to bits corresponding to 0.

For example, although a "periodic" CSI report behavior is configured based on the first information and the periodic CSI report behavior is performed based on the second information having a period as a unit, the periodic CSI report behavior may operate like an aperiodic CSI report within time duration configured based on the second information.

For example, the UE may further receive information to activate a CSI report from the base station based on a "semi-persistent" CSI report behavior being configured based on the first information. The information to activate a CSI report may be received through a MAC CE. Furthermore, the UE may terminate a CSI report behavior based on the second information regardless of a signal that deactivates a CSI report. That is, although a semi-persistent CSI report is transmitted in time duration in which the second information is configured and a deactivation signal is not received, the UE may terminate the CSI report after the time duration.

For example, the "periodic" or "semi-persistent" CSI report behavior may be configured based on the first information. The second information may be configured for time duration including a plurality of slots based on a slot unit in the time domain. In this case, the second information may be interpreted as an offset value per each period, and the UE may change an slot offset value based on the second information, and may transmit CSI.

For example, the "aperiodic" CSI report behavior may be configured based on the first information, and the aperiodic CSI report may be indicated based on the second information. In other words, the second information may substitute DCI triggering of a conventional aperiodic CSI report. The UE may perform the aperiodic CSI report based on the second information even without receiving separate DCI triggering.

For example, bitmap information may be indicated based on the second information configured in the DRX cycle unit. CSI may be transmitted using the time domain behavior (i.e., periodic, aperiodic, or semi-persistent) based on the first information in "on duration" of a DRX cycle corresponding to bits corresponding to 1 in the bitmap.

Furthermore, in the aforementioned UE operation, for the DRX-related operation, the UE may receive DRX-related information. The DRX-related information may be received through RRC signaling (e.g., DRX-Config IE). The DRX-related information may include onDurationTimer, drx-InactivityTimer, drx-RetransmissionTimer, longDRX-Cycle, drxStartOffset, drxShortCycleTimer, shortDRX-Cycle, etc. The DRX-related information may include information on a DRX cycle (e.g., information on "ON duration" to be configured in the UE, information on an "Opportunity for DRX").

For example, the operation of reporting, by the UE (e.g., 100/200 in FIG. 24), CSI at step S2250 may be implemented by the apparatus of FIGS. 24 to 28 to be described later. For example, referring to FIG. 25, the one or more processors 102 may control the one or more transceivers 106 and/or the one or more memories 104 to report CSI. The one or more transceivers 106 may transmit a CSI report.

Figure 23:
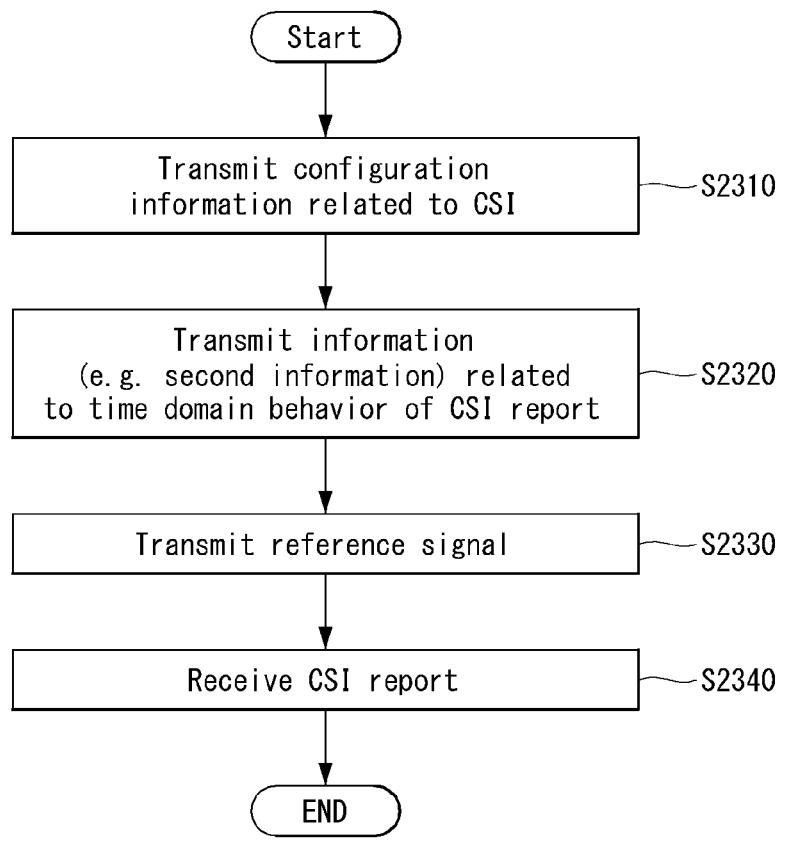
FIG. 23 illustrates an example of a flowchart of an operation of performing, by a base station, data transmission and reception to which a method and/or embodiment proposed in the present disclosure may be applied.

FIG. 23 illustrates an example of a flowchart of an operation of transmitting/receiving, by a base station (BS), data to which methods (e.g., Proposal 1/Proposal 2) proposed in the present disclosure may be applied. FIG. 23 is merely for convenience of description, and does not limit the scope of the present disclosure. Furthermore, some step(s) illustrated in FIG. 23 may be omitted depending on a situation and/or a configuration.

The base station may generally mean an object that performs the transmission and reception of data to and from a UE. For example, the base station may be a concept including one or more transmission points (TPs), one or more transmission and reception Points (TRPs), etc. Furthermore, the TP and/or the TRP may include a panel of a base station, a transmission and reception unit, etc. Furthermore, the TRP may be divided based on information (e.g., an index or an ID) on a CORESET group (or CORESET pool).

For example, if one UE is configured to transmit and receive multiple TRPs (or cells), this may mean that multiple CORESET groups (or CORESET pools) have been configured in one UE. Such a configuration of a CORESET group (or CORESET pool) may be performed through higher layer signaling (e.g., RRC signaling).

For example, the base station may include one or more transceivers, one or more processors, and the one or more memories connected to the one or more processors, for storing instructions for operations executed by the one or more processors.

The base station may transmit, to a UE, configuration information related to CSI (S2310). The configuration information related to CSI may include CSI resource setting, CSI measurement setting, CSI-RS resource setting, CSI report setting, etc. The configuration information may be received through higher layer signaling (e.g., RRC). The configuration information may include pieces of information related to the methods and/or embodiments described in the aforementioned methods (e.g., Proposal 1/Proposal 2).

For example, the configuration information related to CSI may include configuration information (e.g., CSI-ReportConfig) related to a CSI report. That is, the base station may transmit, to the UE, configuration information related to a CSI report. Configuration information (e.g., CSI-ReportConfig) related to one or more CSI reports may be configured in the UE. The configuration information (e.g., CSI-ReportConfig) related to a CSI report may include information (e.g., first information) related with a time domain behavior of the CSI report. For example, the information (e.g., first information) related with the time domain behavior may correspond to a report configuration type (reportConfigType) parameter. A CSI report behavior in the time domain may be configured as one of (i) periodic, (ii) semi-persistent or (iii) aperiodic based on the information (e.g., first information) related with the time domain behavior.

For example, the configuration information (e.g., CSI-ReportConfig) related to a CSI report may include a report quantity (reportQuantity) parameter indicative of a quantity related to CSI to be reported. Report content, such as a CRI, a PMI, a CQI, or an L1-RSRP, may be configured through the report quantity (reportQuantity) parameter. Furthermore, the configuration information (e.g., CSI-ReportConfig) related to a CSI report may include period and slot offset information of the CSI report.

For example, the operation of transmitting, by the base station (e.g., 100/200 in FIG. 24), the configuration information related to CSI at step S2310 may be implemented by the apparatus of FIGS. 24 to 28 to be described later. For example, referring to FIG. 25, the one or more processors 102 may control the one or more transceivers 106 and/or the one or more memories 104 to transmit the configuration information. The one or more transceivers 106 may transmit the configuration information.

The base station may transmit information (e.g., second information) related with a time domain behavior of a CSI report (S2320). The second information may correspond to indication information (or indicator) configured for each specific unit (e.g., a specific resource unit/specific time unit) in the time domain, described in the proposal methods (e.g., Proposal 1/Proposal 2). The second information may be configured through higher layer signaling (e.g., RRC signaling)/MAC-CE/DCI.

For example, the second information may be configured for time duration including a plurality of specific units based on a specific unit in the time domain. That is, the time duration may be configured with a plurality of specific units continuous in the time domain. The second information may be configured for the corresponding time interval.

For example, the second information may have a bitmap form. Each bit of the bitmap may correspond to each of the plurality of specific units. For example, the specific unit may be configured using one of a slot, a subframe, a half-frame or a frame as a unit. Alternatively, the specific unit may have a period (i.e., the period of a CSI report) as a unit. Alternatively, the specific unit may correspond to a DRX cycle. In other words, the second information may be configured in a bitmap form configured with bits corresponding to a specific unit (e.g., a slot, a sub frame, a half-frame, a frame, a period or a DRX cycle) unit. The base station may transmit information for the specific unit to the UE.

For example, the time duration may be determined based on the number of bits of the bitmap. Since each bit of the bitmap may correspond to each specific unit, the time duration may be determined based on the number of plurality of specific units.

For example, the second information may be configured for time duration including a plurality of slots based on a slot unit in the time domain. An offset value per each period for a periodic CSI report behavior may be determined based on the second information.

For example, if one or more CSI report settings (e.g., CSI-ReportConfig), that is, configuration information related to one or more CSI reports, has been configured in the UE, whether to apply the second information to configuration information related to all the CSI reports or whether to apply the second information to configuration information related to a specific (some) CSI report may be further indicated.

For example, the operation of transmitting, by the base station (e.g., 100/200 in FIG. 24), information (e.g., second information) related with the time domain behavior of the CSI report at step S2320 may be implemented by the apparatus of FIGS. 24 to 28 to be described later. For example, referring to FIG. 25, the one or more processors 102 may control the one or more transceivers 106 and/or the one or more memories 104 to transmit the information (e.g., second information) related with the time domain behavior of the CSI report. The one or more transceivers 106 may transmit the information (e.g., second information) related with the time domain behavior of the CSI report.

The base station may transmit, to the UE, a reference signal for a CSI measurement (S2330). For example, the reference signal may be a CSI-RS. The reference signal may be transmitted periodically, aperiodically or semi-persistently.

For example, the operation of transmitting, by the base station (e.g., 100/200 in FIG. 24), the reference signal at step S2330 may be implemented by the apparatus of FIGS. 24 to 28 to be described later. For example, referring to FIG. 25, the one or more processors 102 may control the one or more transceivers 106 and/or the one or more memories 104 to transmit the reference signal. The one or more transceivers 106 may transmit the reference signal.

The base station may receive a CSI report from the UE (S2340). The CSI may be measured based on the reference signal. The CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI) or an L1-RSRP.

For example, the CSI may be received in the time domain based on the first information and second information related with the time domain behavior of the CSI report. A periodic, semi-persistent or periodic CSI report behavior may be configured based on the first information. Furthermore, the second information having a bitmap form may be configured, and the CSI report may be transmitted in a specific unit corresponding to bits corresponding to 1 and the CSI report may not be transmitted in a specific unit corresponding to bits corresponding to 0 in the bitmap.

For example, a "periodic" CSI report behavior may be configured based on the first information. Although the periodic CSI report behavior is based on the second information having a period as a unit, the periodic CSI report behavior may operate like an aperiodic CSI report within time duration configured based on the second information.

For example, the base station may further transmit information to activate a CSI report to the UE based on the "semi-persistent" CSI report behavior being configured based on the first information. The information to activate a CSI report may be transmitted through a MAC CE. In this case, the CSI report may be terminated based on the second information regardless of a signal that deactivates the CSI report.

For example, a "periodic" or "semi-persistent" CSI report behavior may be configured based on the first information. The second information may be configured for time duration including a plurality of slots based on a slot unit in the time domain. In this case, the second information may be interpreted as an offset value per each period. The UE may change a slot offset value based on the second information, and may transmit CSI.

For example, an "aperiodic" CSI report behavior may be configured based on the first information, and an aperiodic CSI report may be indicated based on the second information. In other words, the second information may substitute DCI triggering of a conventional aperiodic CSI report. The UE may perform an aperiodic CSI report based on the second information even without receiving separate DCI triggering.

For example, bitmap information may be indicated based on the second information configured in a DRX cycle unit. CSI may be received using a time domain behavior (i.e., periodic, aperiodic or semi-persistent) based on the first information in "on duration" of a DRX cycle corresponding to bits corresponding to 1 in the bitmap.

Furthermore, for the aforementioned DRX-related operation, the base station may also transmit DRX-related information to the UE. The DRX-related information may be transmitted through RRC signaling (e.g., DRX-Config IE). The DRX-related information may include onDurationTimer, drx-InactivityTimer, drx-RetransmissionTimer, longDRX-Cycle, drxStartOffset, drxShortCycleTimer, shortDRX-Cycle, etc.

For example, the operation of receiving, by the base station (e.g., 100/200 in FIG. 24), the CSI report at step S2340 may be implemented by the apparatus of FIGS. 24 to 28 to be described later. For example, referring to FIG. 25, the one or more processors 102 may control the one or more transceivers 106 and/or the one or more memories 104 to receive the CSI report. The one or more transceivers 106 may receive the CSI report.

As described above, the base station/UE signaling and operation (e.g., Proposal 1/2/FIG. 22/FIG. 23) may be implemented by an apparatus (e.g., FIGS. 24 to 28) to be described later. For example, the base station may correspond to a first wireless device, and the UE may correspond to a second wireless device, and an opposite case may be considered according to circumstances.

For example, the base station/UE signaling and operation (e.g., Proposal 1/2/FIG. 22/FIG. 23) may be processed by one or more processors (e.g., 102, 202) in FIGS. 24 to 28. The base station/UE signaling and operation (e.g., Proposal 1/2/FIG. 22/FIG. 23) may be stored in one or more memories (e.g., 104, 204) in the form of an instruction/program (e.g., an instruction or an executable code) for driving at least one processor (e.g., 102, 202) in FIGS. 24 to 28.

For example, in an apparatus including one or more memories and one or more processors functionally connected to the one or more memories according to an embodiment of the present disclosure, the one or more processors may control the apparatus to receive configuration information related to a CSI report. The configuration information includes first information related with a time domain behavior of a CSI report, and a CSI report behavior in the time domain may be configured as one of (i) periodic, (ii) semi-persistent or (iii) aperiodic based on the first information. Furthermore, the one or more processors may control the apparatus to receive second information related with the time domain behavior of the CSI report. The second information may be configured for time duration including a plurality of specific units based on a specific unit in the time domain. Furthermore, the one or more processors may control the apparatus to receive a reference signal for a CSI measurement, perform the CSI measurement based on the reference signal, and reporting CSI in the time domain based on the first information and the second information.

For example, in one or more non-transitory computer-readable media storing one or more instructions according to an embodiment of the present disclosure, the one or more instructions executable by one or more processors may include instructions that instruct a UE to receive configuration information related to a CSI report. The configuration information includes first information related with a time domain behavior of a CSI report. A CSI report behavior in the time domain may be configured as one of (i) periodic, (ii) semi-persistent or (iii) aperiodic based on the first information. Furthermore, the one or more instructions may include instructions that instruct the UE to receive second information related with the time domain behavior of the CSI report. The second information may be configured for time duration including a plurality of specific units based on a specific unit in the time domain. Furthermore, the one or more instructions may include instructions that instruct the UE to receive a reference signal for a CSI measurement, perform the CSI measurement based on the reference signal, and report CSI in the time domain based on the first information and the second information.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
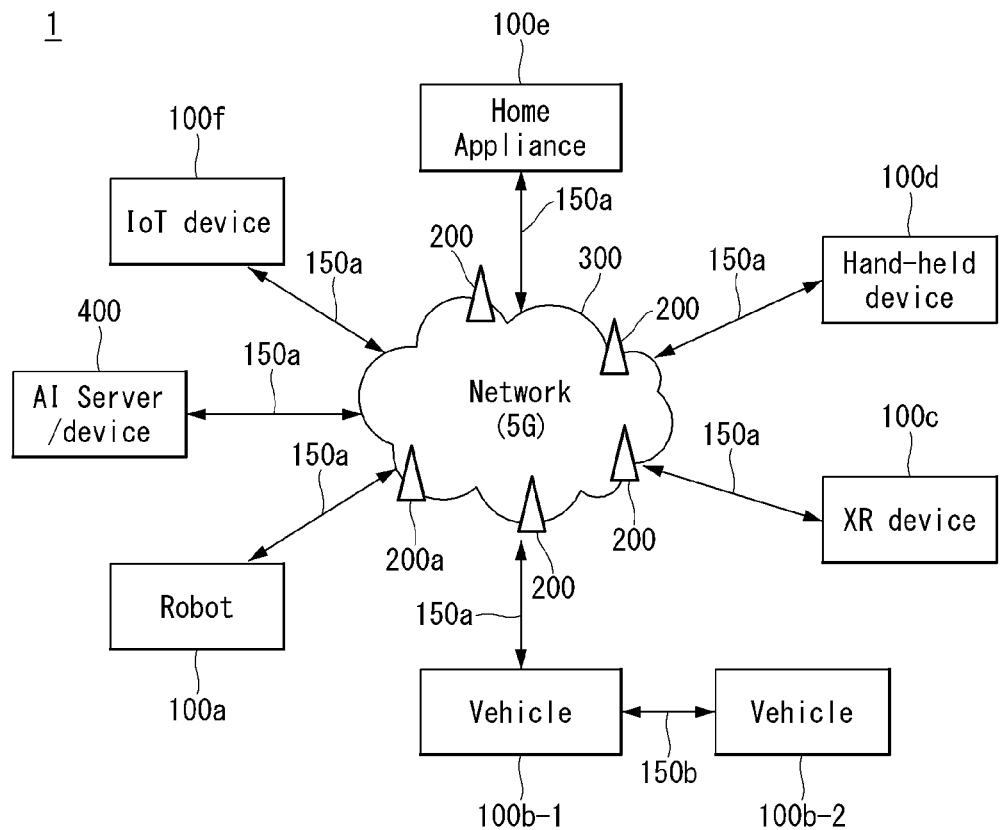
FIG. 24 illustrates a communication system (1) applied to the present disclosure.

FIG. 24 illustrates a communication system applied to the present disclosure.

Referring to FIG. 24, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

Figure 25:
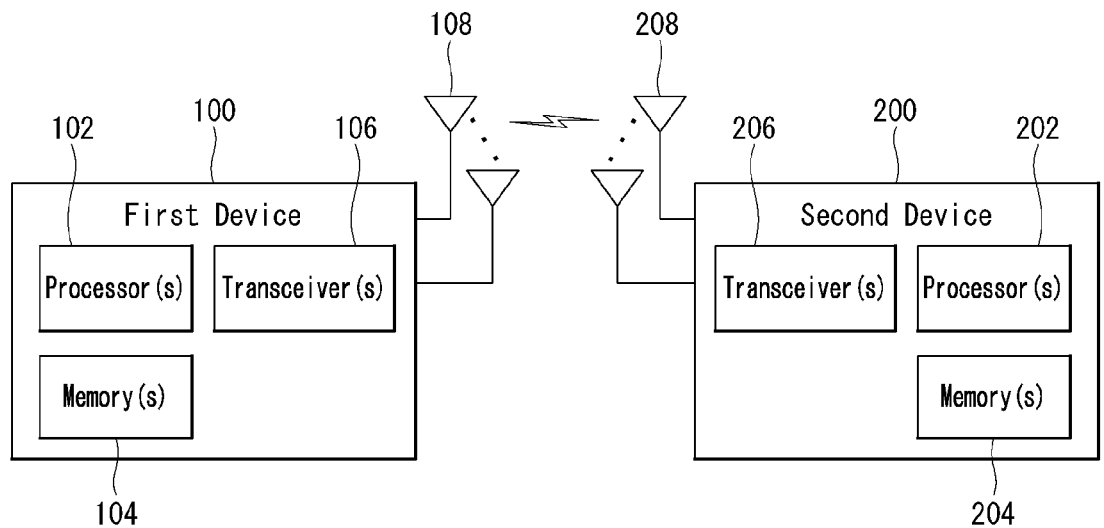
FIG. 25 illustrates a wireless device which may be applied to the present disclosure.

FIG. 25 illustrates wireless devices applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Invention is Applied

Figure 26:
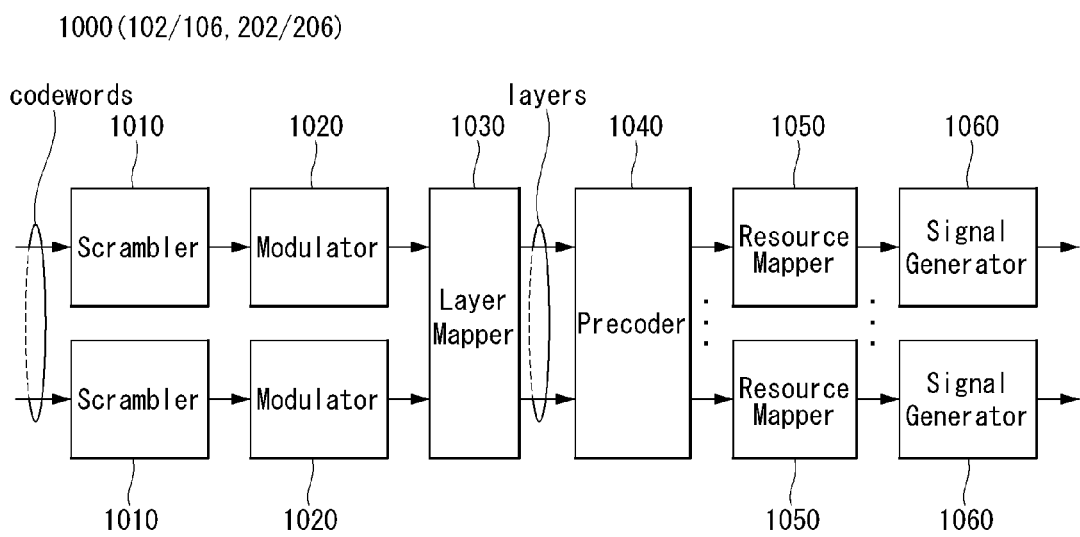
FIG. 26 illustrates a signal processing circuit for a transmit signal.

FIG. 26 illustrates a signal processing circuit for a transmit signal.

Referring to FIG. 26, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 26 may be performed by the processors 102 and 202 and/or the transceivers 106 and 206 of FIG. 25. Hardware elements of FIG. 26 may be implemented in the processors 102 and 202 and/or the transceivers 106 and 206 of FIG. 25. For example, blocks 1010 to 1060 may be implemented in the processors 102 and 202 of FIG. 25. Further, blocks 1010 to 1050 may be implemented in the processors 102 and 202 of FIG. 25 and the block 1060 of FIG. 25 and the block 1060 may be implemented in the transceivers 106 and 206 of FIG. 25.

A codeword may be transformed into a radio signal via the signal processing circuit 1000 of FIG. 26. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 26. For example, the wireless device (e.g., 100 or 200 of FIG. 25) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

Figure 27:
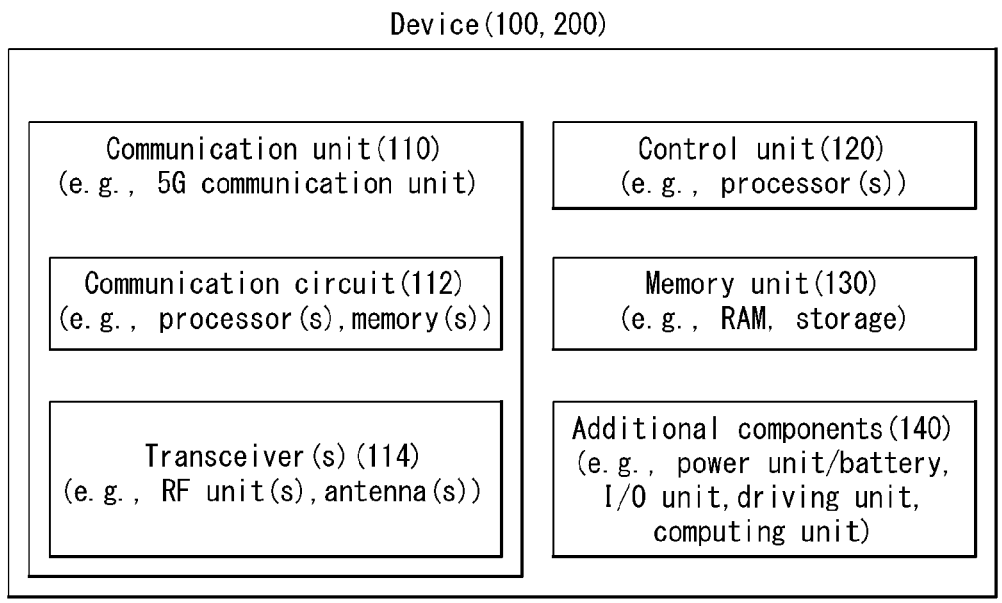
FIG. 27 illustrates another example of a wireless device applied to the present disclosure.

FIG. 27 illustrates another example of a wireless device applied to the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 25. For example, the transceiver(s) 114 may include the one or more transceivers 106 and 106 and/or the one or more antennas 108 and 108 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

Figure 28:
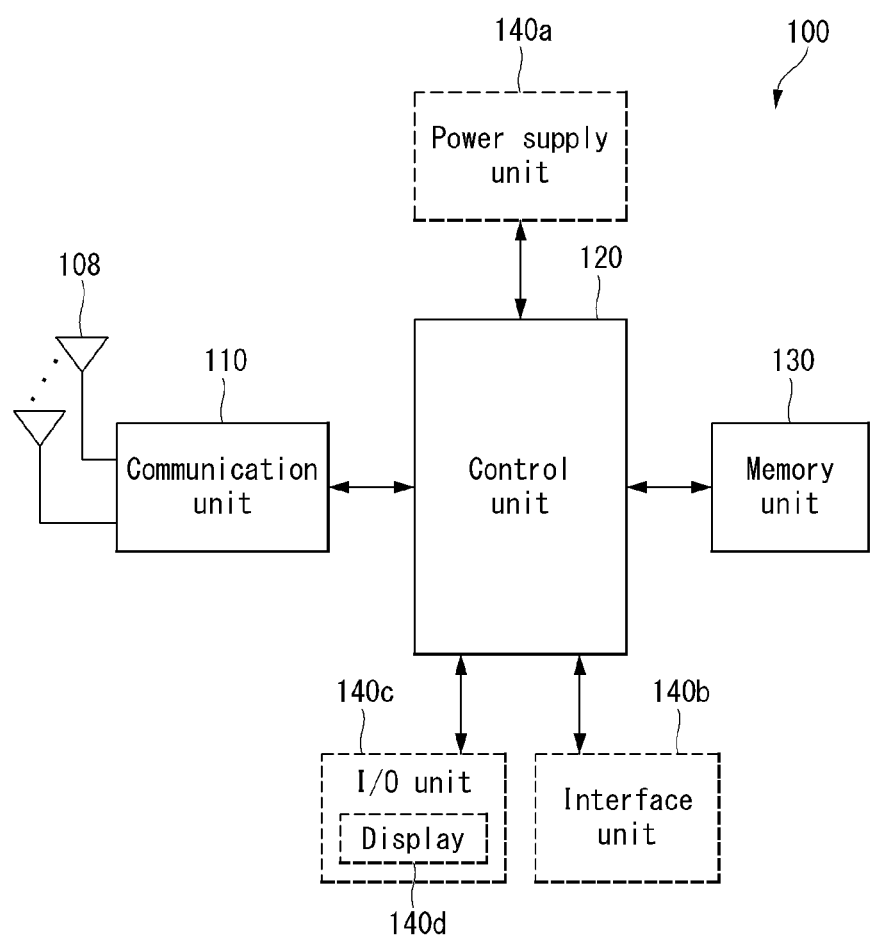
FIG. 28 illustrates a portable device applied to the present disclosure.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Portable Device Example to which Present Invention is Applied FIG. 28 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 28, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 27, respectively The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

In this case, the wireless communication technology implemented in the wireless device 100, 200 of the present disclosure may include narrowband Internet of things for low power communication, in addition to LTE, NR and 6G. In this case, for example, the NB-IoT technology may be an example of a low power wide area network (LPWAN) technology, may be implemented according to standards, such as LTE Cat NB1 and/or LTE Cat NB2, and is not limited to the aforementioned names. Additionally or alternatively, the wireless communication technology implemented in the wireless device 100, 200 of the present disclosure may perform communication based on an LTE-M technology. In this case, for example, the LTE-M technology may be an example of the LPWAN technology, and may be called various names, such as enhanced machine type communication (eMTC). For example, the LTE-M technology may be implemented as at least one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the aforementioned names. Additionally or alternatively, the wireless communication technology implemented in the wireless device 100, 200 of the present disclosure may include at least one of ZigBee, Bluetooth and a low power wide area network (LPWAN) in which low power communication has been considered, and is not limited to the aforementioned names. For example, the ZigBee technology may generate personal area networks (PAN) related to small-sized/low-power digital communication based on various standards, such as IEEE 802.15.4, and may be called various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

According to an embodiment of the present disclosure, a time domain behavior of a CSI report can be flexibly configured.

Furthermore, according to an embodiment of the present disclosure, a reporting operation configuration is made possible and efficiency can be improved from a signaling overhead viewpoint, compared to a time domain behavior for the existing CSI report.

Furthermore, according to an embodiment of the present disclosure, a CSI report may be configured to be performed by considering a DRX cycle.

Furthermore, according to an embodiment of the present disclosure, an aperiodic CSI reporting may be triggered regardless of a DCI format.

Effects which may be obtained by the present disclosure are not limited to the aforementioned effects, and other technical effects not described above may be evidently understood by a person having ordinary skill in the art to which the present disclosure pertains from the above description.

The method for transmitting/receiving CSI in a wireless communication system of the present disclosure has been described based on an example applied to a 3GPP LTE/LTE-A system and a 5G system (new RAT system), but the method may be applied to various other wireless communication systems.

What is claimed is:

1. A method for reporting, by a user equipment (UE), channel state information (CSI) in a wireless communication system, the method comprising:
   receiving configuration information related to a CSI report,
   wherein the configuration information includes first information related with a time domain behavior of the CSI report, and
   wherein based on the first information, one of (i) periodic, (ii) semi-persistent or (iii) aperiodic is configured as a behavior of the CSI report in the time domain;
   receiving second information related with a time domain behavior of the CSI report,
   wherein the second information is configured for a time duration including a plurality of specific units based on a specific unit in the time domain;
   receiving a reference signal for a CSI measurement;
   performing the CSI measurement based on the reference signal; and
   reporting the CSI in the time domain based on the first information and the second information,
   wherein the second information is configured for the time duration including a plurality of slots based on a slot unit in the time domain,
   wherein an offset value per each period for a periodic CSI report behavior is determined based on the second information,
   wherein the second information is configured for each slot unit of the plurality of slots, and is in a form of a bitmap,
   wherein each bit of the bitmap is related to each specific unit of the plurality of specific units,
   wherein the specific unit corresponds to a DRX cycle, and
   wherein the CSI report is transmitted in an "on" duration of the DRX cycle related to bits related to 1 in the bitmap.

2. The method of claim 1,
   wherein the specific unit is one of a slot, a subframe, a half-frame or a frame.

3. The method of claim 1,
wherein the time duration is determined based on a number of bits of the bitmap.

4. The method of claim 1,
wherein a "periodic" CSI report behavior is configured based on the first information, and
wherein the specific unit has a period as a unit.

5. The method of claim 1, further comprising:
receiving information for activating the CSI report, based on that a "semi-persistent" CSI report behavior is configured based on the first information.

6. The method of claim 1,
wherein an "periodic" CSI report behavior is configured based on the first information, and
wherein an aperiodic CSI report is included in the second information.

7. The method of claim 2, further comprising:
receiving information for the specific unit.

8. The method of claim 5,
wherein the CSI report is terminated based on the second information regardless of a signal that deactivates the CSI report.

9. A user equipment (UE) configured to report channel state information (CSI) in a wireless communication system, the UE comprising:
one or more transceivers;
one or more processors; and
one or more memories storing instructions for operations executed by the one or more processors and connected to the one or more processors,
wherein the operations include:
receiving configuration information related to a CSI report,
wherein the configuration information includes first information related with a time domain behavior of the CSI report, and
wherein based on the first information, one of (i) periodic, (ii) semi-persistent or (iii) aperiodic is configured as a behavior of the CSI report in the time domain;
receiving second information related with a time domain behavior of the CSI report,
wherein the second information is configured for a time duration including a plurality of specific units based on a specific unit in the time domain;
receiving a reference signal for a CSI measurement;
performing the CSI measurement based on the reference signal; and
reporting the CSI in the time domain based on the first information and the second information,
wherein the second information is configured for the time duration including a plurality of slots based on a slot unit in the time domain,
wherein an offset value per each period for a periodic CSI report behavior is determined based on the second information,
wherein the second information is configured for each slot unit of the plurality of slots, and is in a form of a bitmap,
wherein each bit of the bitmap is related to each specific unit of the plurality of specific units,
wherein the specific unit corresponds to a DRX cycle, and
wherein the CSI report is transmitted in an "on" duration of the DRX cycle related to bits related to 1 in the bitmap.

10. A method for receiving, by a base station (BS), channel state information (CSI) in a wireless communication system, the method comprising:
transmitting, to a user equipment (UE), configuration information related to a CSI report,
wherein the configuration information includes first information related with a time domain behavior of the CSI report, and
wherein based on the first information, one of (i) periodic, (ii) semi-persistent or (iii) aperiodic is configured as a behavior of the CSI report in the time domain;
transmitting second information related with a time domain behavior of the CSI report,
wherein the second information is configured for a time duration including a plurality of specific units based on a specific unit in the time domain;
transmitting a reference signal for a CSI measurement; and
receiving CSI in the time domain based on the first information and the second information,
wherein the second information is configured for the time duration including a plurality of slots based on a slot unit in the time domain,
wherein an offset value per each period for a periodic CSI report behavior is determined based on the second information,
wherein the second information is configured for each slot unit of the plurality of slots, and is in a form of a bitmap,
wherein each bit of the bitmap is related to each specific unit of the plurality of specific units,
wherein the specific unit corresponds to a DRX cycle, and
wherein the CSI report is transmitted in an "on" duration of the DRX cycle related to bits related to 1 in the bitmap.

* * * * *